United States Patent
Choi et al.

(10) Patent No.: US 11,150,923 B2
(45) Date of Patent: Oct. 19, 2021

(54) ELECTRONIC APPARATUS AND METHOD FOR PROVIDING MANUAL THEREOF

(71) Applicant: Samsung Electronics Co., Ltd., Suwon-si (KR)

(72) Inventors: Wonjong Choi, Suwon-si (KR); Soofeel Kim, Suwon-si (KR); Yewon Park, Suwon-si (KR); Jina Ham, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/749,333

(22) Filed: Jan. 22, 2020

(65) Prior Publication Data
US 2021/0081164 A1    Mar. 18, 2021

(30) Foreign Application Priority Data

Sep. 16, 2019  (KR) .................. 10-2019-0113790
Sep. 26, 2019  (KR) .................. 10-2019-0119099

(51) Int. Cl.
*G06F 9/451*       (2018.01)
*G06F 3/16*        (2006.01)
(Continued)

(52) U.S. Cl.
CPC .............. *G06F 9/453* (2018.02); *G06F 3/167* (2013.01); *G10L 15/22* (2013.01); *G10L 25/63* (2013.01); *G09B 5/12* (2013.01); *G09B 7/04* (2013.01)

(58) Field of Classification Search
CPC ......... G06F 9/453; G06F 3/167; G10L 25/63; G10L 15/22
See application file for complete search history.

(56) References Cited

U.S. PATENT DOCUMENTS

| 4,955,066 A | * | 9/1990 | Notenboom | ............ G06T 9/005 358/1.9 |
| 6,020,886 A | * | 2/2000 | Jacober | .................. G06F 9/453 715/709 |

(Continued)

FOREIGN PATENT DOCUMENTS

| JP | 2002-268888 A | 9/2002 |
| JP | 2004-355080 A | 12/2004 |
| JP | 2005-341182 A | 12/2005 |
| JP | 2013-161446 A | 8/2013 |
| KR | 10-0371406 B1 | 2/2003 |

(Continued)

OTHER PUBLICATIONS

Matthew Fagan and Martin Miller, Approaching AI Inventions Under New USPTO Guidance, Law360 (https://www.law360.com/articles/1147595/approaching-ai-inventions-under-new-USPTO-guidance) (Apr. 9, 2019). (Year: 2019).*

(Continued)

*Primary Examiner* — Justin R. Blaufeld
(74) *Attorney, Agent, or Firm* — Jefferson IP Law, LLP

(57) ABSTRACT

A method for providing a manual of an electronic apparatus is provided. The method includes providing a display device with one of a plurality of manuals for an external device, obtaining a user response for the provided manual, determining an understanding level for the manual based on the obtained user response, and substituting the provided manual with another manual among the plurality of manuals according to the understanding level. The plurality of manuals may include a general manual, a detailed manual, and a simple manual.

12 Claims, 20 Drawing Sheets

(51) Int. Cl.
*G10L 15/22* (2006.01)
*G10L 25/63* (2013.01)
*G09B 5/12* (2006.01)
*G09B 7/04* (2006.01)

(56) References Cited

U.S. PATENT DOCUMENTS

| | | | |
|---|---|---|---|
| 6,021,403 A * | 2/2000 | Horvitz | G06N 5/00 706/45 |
| 6,452,607 B1 * | 9/2002 | Livingston | G06F 9/453 715/705 |
| 6,651,053 B1 * | 11/2003 | Rothschild | G06F 16/9554 707/770 |
| 6,657,643 B1 * | 12/2003 | Horvitz | G06Q 10/109 715/764 |
| 6,690,390 B1 * | 2/2004 | Walters | G06F 3/04895 715/705 |
| 6,806,906 B1 * | 10/2004 | Soga | H04N 5/232945 348/333.03 |
| 6,842,877 B2 * | 1/2005 | Robarts | G06F 21/606 715/708 |
| 7,024,658 B1 * | 4/2006 | Cohen | G06F 9/453 717/117 |
| 7,027,508 B2 | 4/2006 | Shibata et al. | |
| 7,669,125 B2 * | 2/2010 | Smirnov | G06F 3/0481 715/705 |
| 7,890,336 B2 | 2/2011 | Birnbaum et al. | |
| 8,219,115 B1 * | 7/2012 | Nelissen | G06F 9/54 455/456.3 |
| 8,386,931 B2 * | 2/2013 | Guckenheimer | G06F 3/04895 715/708 |
| 8,566,718 B1 * | 10/2013 | O'Neill | G09B 5/067 715/709 |
| 8,645,816 B1 * | 2/2014 | Kelley | G06F 40/143 715/236 |
| 2002/0059334 A1 * | 5/2002 | Jelbert | G06F 16/9577 715/273 |
| 2003/0063113 A1 * | 4/2003 | Andrae | G06F 40/58 715/700 |
| 2004/0130572 A1 * | 7/2004 | Bala | G06F 9/453 715/762 |
| 2004/0145601 A1 * | 7/2004 | Brielmann | G06F 9/453 715/708 |
| 2005/0050096 A1 * | 3/2005 | Gomes | G06Q 10/06 |
| 2005/0138559 A1 * | 6/2005 | Santos-Gomez | G06F 3/0481 715/709 |
| 2005/0153688 A1 * | 7/2005 | Burkhart | H04L 67/04 455/414.3 |
| 2005/0268234 A1 * | 12/2005 | Rossi, Jr. | G06F 9/453 715/705 |
| 2006/0041926 A1 | 2/2006 | Istvan et al. | |
| 2006/0168285 A1 * | 7/2006 | Nielsen | G06F 16/958 709/231 |
| 2006/0173816 A1 * | 8/2006 | Jung | G06Q 10/00 |
| 2006/0184880 A1 * | 8/2006 | Bala | G06F 9/453 715/705 |
| 2006/0235736 A1 * | 10/2006 | Guckenheimer | G06F 9/453 715/708 |
| 2006/0242607 A1 * | 10/2006 | Hudson | G06F 3/04817 715/863 |
| 2007/0061722 A1 * | 3/2007 | Kronlund | G06F 3/0481 715/705 |
| 2007/0203891 A1 * | 8/2007 | Solaro | G06F 16/951 |
| 2007/0226650 A1 * | 9/2007 | Hintermeister | G06F 3/048 715/822 |
| 2008/0070205 A1 * | 3/2008 | Amick | G06Q 10/00 434/178 |
| 2008/0129686 A1 * | 6/2008 | Han | G06F 3/0488 345/156 |
| 2008/0163130 A1 * | 7/2008 | Westerman | G06K 9/00355 715/863 |
| 2009/0055386 A1 * | 2/2009 | Boss | G06F 16/3338 |
| 2009/0164464 A1 * | 6/2009 | Carrico | G06F 16/3331 |
| 2009/0189974 A1 * | 7/2009 | Deering | G02B 27/017 348/46 |
| 2009/0195376 A1 * | 8/2009 | Miller | B60R 25/241 340/457.1 |
| 2009/0249253 A1 * | 10/2009 | Mercer | G06F 3/0489 715/827 |
| 2009/0254826 A1 * | 10/2009 | Schwab | H04M 1/271 715/716 |
| 2010/0049515 A1 | 2/2010 | Sumiyoshi et al. | |
| 2010/0093319 A1 * | 4/2010 | Sherman | G06F 9/453 455/414.1 |
| 2010/0174599 A1 * | 7/2010 | Rosenblatt | H04B 5/0031 705/14.37 |
| 2010/0180200 A1 * | 7/2010 | Donneau-Golencer | G06Q 10/10 715/705 |
| 2010/0306712 A1 * | 12/2010 | Snook | G06K 9/00342 715/863 |
| 2010/0318357 A1 | 12/2010 | Istvan et al. | |
| 2011/0021234 A1 * | 1/2011 | Tibbitts | H04W 48/04 455/517 |
| 2011/0099474 A1 * | 4/2011 | Grossman | G06F 9/453 715/709 |
| 2011/0125734 A1 * | 5/2011 | Duboue | G09B 7/00 707/723 |
| 2011/0273589 A1 * | 11/2011 | Mochimizo | H04N 9/8715 348/231.99 |
| 2011/0294520 A1 * | 12/2011 | Zhou | H04W 48/04 455/456.1 |
| 2011/0295903 A1 * | 12/2011 | Chen | G06F 16/285 707/794 |
| 2012/0101888 A1 * | 4/2012 | Rothschild | G06Q 30/02 705/14.23 |
| 2012/0110444 A1 * | 5/2012 | Li | G06F 40/157 715/256 |
| 2012/0117470 A1 * | 5/2012 | Michelstein | G06F 3/0482 715/709 |
| 2012/0124035 A1 * | 5/2012 | Vaidyanathan | G06F 16/903 707/723 |
| 2012/0159330 A1 * | 6/2012 | Jeong | G06F 3/017 715/716 |
| 2012/0199645 A1 * | 8/2012 | Rothschild | G06K 7/1413 235/375 |
| 2012/0200574 A1 * | 8/2012 | Hill | G06F 9/453 345/473 |
| 2012/0209573 A1 * | 8/2012 | Karrat | G06F 30/00 703/1 |
| 2012/0209922 A1 * | 8/2012 | Bhatia | H04L 51/18 709/206 |
| 2012/0210203 A1 * | 8/2012 | Kandekar | G06F 15/0291 715/230 |
| 2012/0233631 A1 * | 9/2012 | Geshwind | H04N 21/2547 725/1 |
| 2012/0240043 A1 * | 9/2012 | Hinckley | G06F 3/04883 715/705 |
| 2013/0054501 A1 * | 2/2013 | Lassesen | G06Q 30/02 706/45 |
| 2013/0090103 A1 * | 4/2013 | Kim | H04M 1/72463 455/418 |
| 2013/0091409 A1 * | 4/2013 | Jeffery | G06F 16/4393 715/202 |
| 2013/0127980 A1 * | 5/2013 | Haddick | G02B 27/0093 348/14.08 |
| 2014/0006944 A1 * | 1/2014 | Selig | G06F 9/453 715/705 |
| 2014/0006991 A1 * | 1/2014 | Kalaidjian | G06F 8/74 715/771 |
| 2014/0067730 A1 * | 3/2014 | Kozloski | G06N 7/005 706/12 |
| 2014/0074824 A1 * | 3/2014 | Rad | G06Q 10/10 707/722 |
| 2014/0075304 A1 * | 3/2014 | Bailey | G06F 9/453 715/705 |
| 2014/0075312 A1 * | 3/2014 | Dingsor | G06F 16/438 715/716 |

(56) References Cited

U.S. PATENT DOCUMENTS

| | | | |
|---|---|---|---|
| 2014/0075363 A1* | 3/2014 | Kritt | G06F 3/0482 |
| | | | 715/772 |
| 2014/0136013 A1 | 5/2014 | Wolverton et al. | |
| 2015/0310865 A1 | 10/2015 | Fay et al. | |
| 2016/0117406 A1* | 4/2016 | Agrawal | G06F 16/3346 |
| | | | 707/749 |
| 2016/0203726 A1* | 7/2016 | Hibbs | G09B 7/02 |
| | | | 434/308 |
| 2016/0209648 A1* | 7/2016 | Haddick | G06F 3/03547 |
| 2017/0031652 A1 | 2/2017 | Kam et al. | |
| 2017/0087460 A1* | 3/2017 | Perry | A63F 13/25 |
| 2017/0134922 A1* | 5/2017 | Chiu | H04M 1/72418 |
| 2017/0192232 A1* | 7/2017 | Katz | G06T 19/006 |
| 2017/0315825 A1* | 11/2017 | Gordon | G06N 20/00 |
| 2017/0316707 A1* | 11/2017 | Lawrenson | A61B 5/165 |
| 2018/0151088 A1* | 5/2018 | Tan | G07C 5/008 |
| 2018/0322870 A1 | 11/2018 | Lee et al. | |
| 2019/0026367 A1 | 1/2019 | Boss et al. | |
| 2019/0043500 A1 | 2/2019 | Malik et al. | |
| 2020/0152304 A1* | 5/2020 | Chang | G10L 15/26 |
| 2020/0265735 A1* | 8/2020 | Byron | G09B 7/08 |

FOREIGN PATENT DOCUMENTS

| | | | |
|---|---|---|---|
| KR | 10-2016-0058438 A | 5/2016 | |
| KR | 10-2017-0014353 A | 2/2017 | |
| WO | WO-2016064314 A1 * | 4/2016 | A61B 5/163 |

OTHER PUBLICATIONS

Will Knight, The Dark Secret at the Heart of AI, 120 MIT Technology Review 54-63 (May 18, 2017) (Year: 2017).*

Yenigalla et al., Speech Emotion Recognition Using Spectrogram & Phoneme Embedding, in 19th Annual Conference of the International Speech Communication, Interspeech 2018 (Sep. 2-6, 2018), https://dialog.proquest.com/professional/docview/2126225109 (Year: 2018).*

Fayek et al., Towards Real-time Speech Emotion Recognition using Deep Neural Networks, 2015 9th International Conference on Signal Processing and Communication Systems (ICSPCS), https://ieeexplore.IEEE.org/document/7391796 (Year: 2015).*

International Search Report dated Jun. 15, 2020, issued in International Application No. PCT/KR2020/001278.

* cited by examiner

FIG. 10
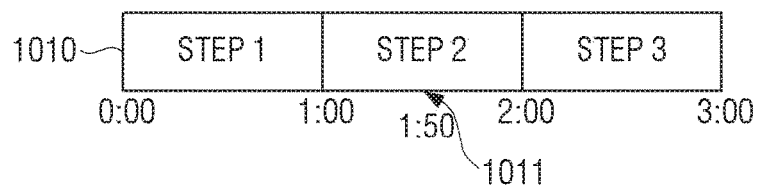
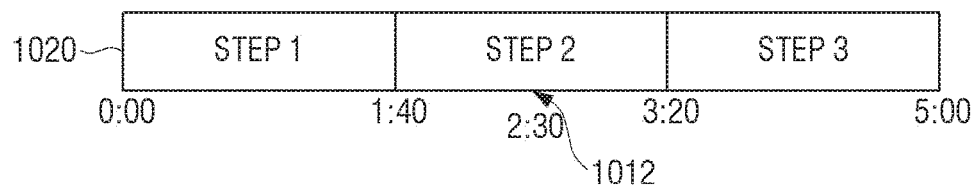
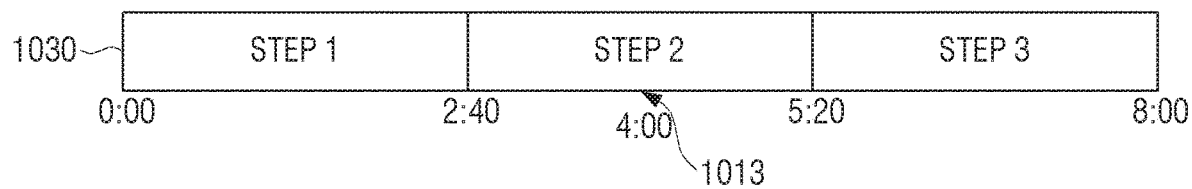

FIG. 13
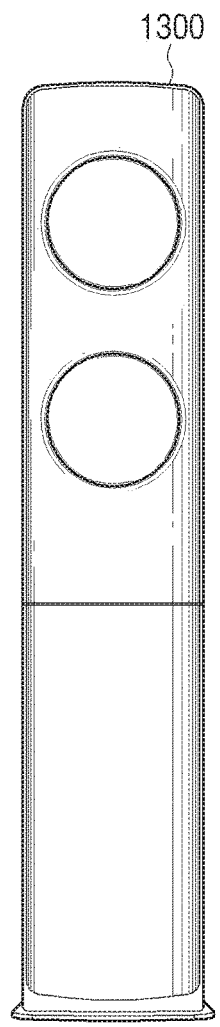
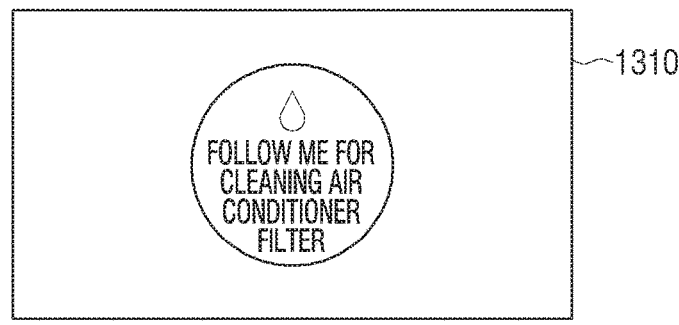
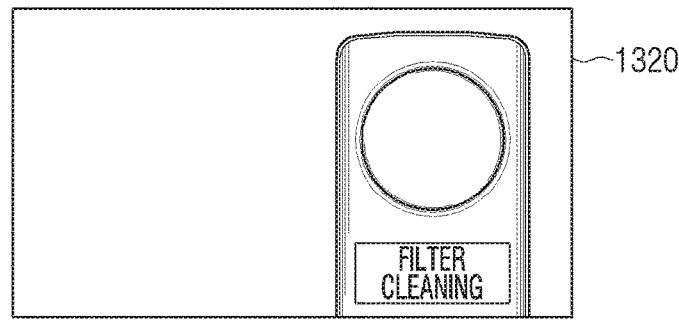
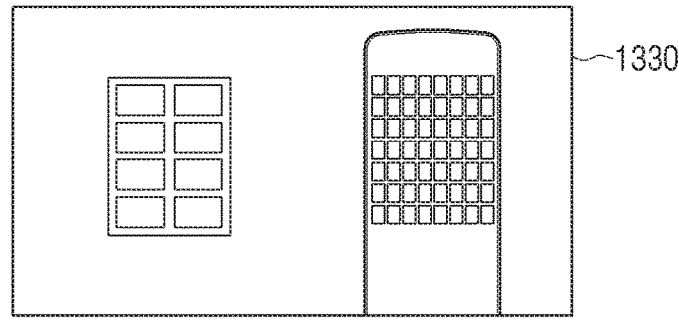
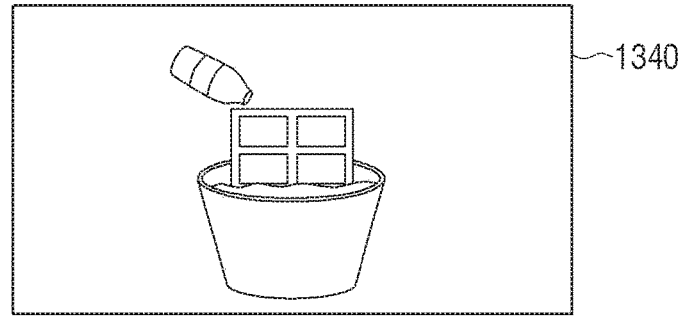
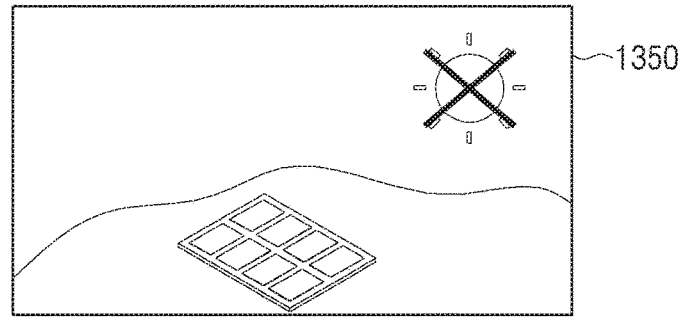

FIG. 17
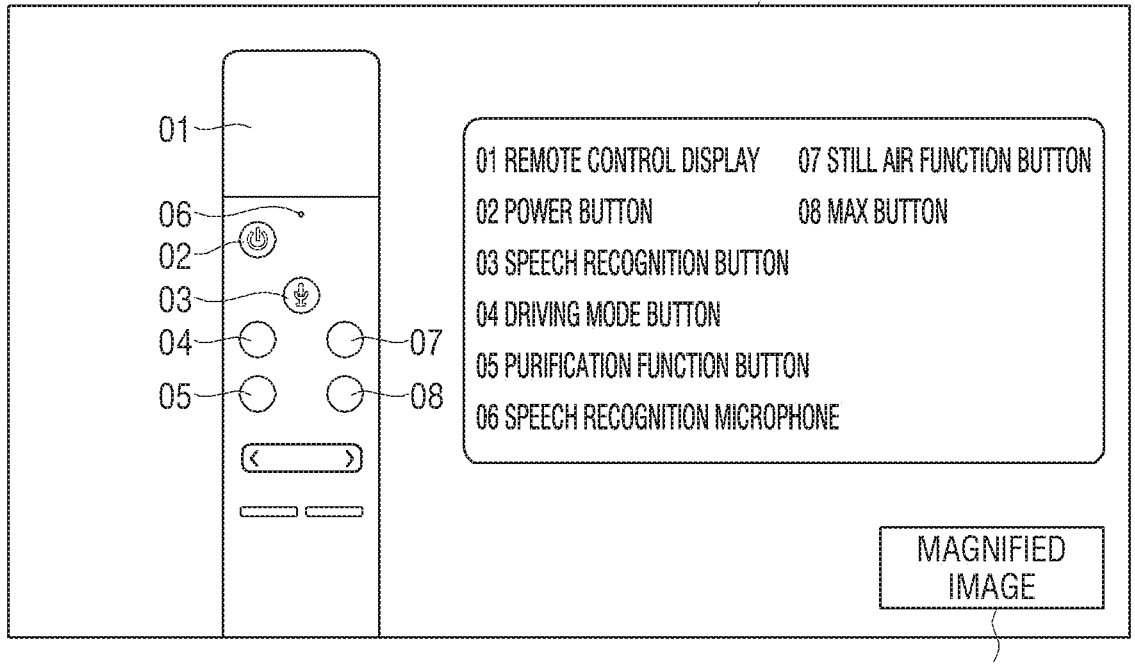
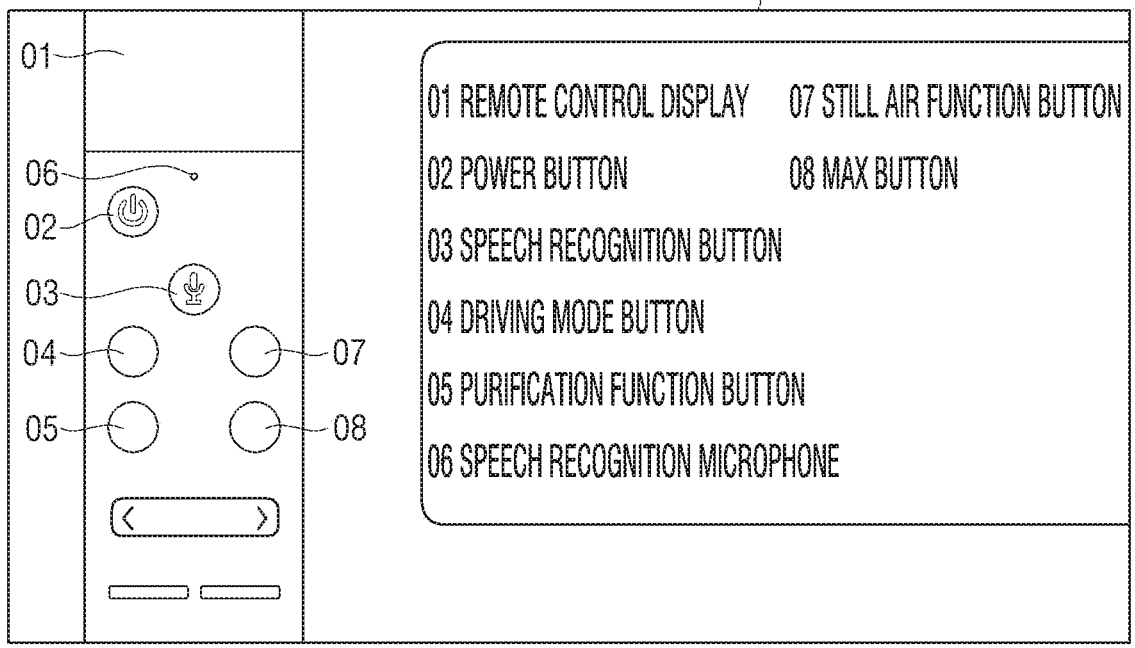

ELECTRONIC APPARATUS AND METHOD FOR PROVIDING MANUAL THEREOF

CROSS-REFERENCE TO RELATED APPLICATION(S)

This application is based on and claims priority under 35 U.S.C. § 119(a) of a Korean patent application number 10-2019-0119099, filed on Sep. 26, 2019, and a Korean patent application number 10-2019-0113790, field on Sep. 16, 2019, in the Korean Intellectual Property Office, the disclosure of each of which is incorporated by reference herein in its entirety.

BACKGROUND

1. Field

The disclosure relates to an electronic apparatus and a method for providing a manual. More particularly, the disclosure relates to an electronic apparatus for providing a manual according to a user response and a method for providing a manual thereof.

2. Description of Related Art

The development of electronic technology has enabled a user to be provided with various content at any time through a user terminal device. The user terminal device may receive or store various types of content, such as images, voice, and video, as well as a text, from an external device, and may provide the same to a user.

In particular, recently, content such as instructions or guides for providing a user with information are also provided as content such as an image, voice, a video, or the like, in order to facilitate understanding of the user, and the user can more intuitively and easily obtain information by using content such as an image, voice, a video or the like.

However, in that the content is delivered unilaterally to the user, that is, the content is provided to the user without consideration of the user response or user's understanding level of the content, the user may feel inconvenient to navigate (e.g., forward, rewind, stop, etc.) the provided content or search other content if the provided content is not suitable for the user.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at lease the above-mentioned problems and/or advantages and to provide at least the advantages described below. Accordingly, an aspect of the disclosure is to provide an electronic apparatus for determining a user's understanding level for a manual provided to a user and providing the user with a suitable manual based on the determined understanding level, and a method for providing a manual thereof.

Additional aspects will be set forth in part in the description which follows and, in part, will be apparent from the description, or may be learned by practice of the presented embodiments.

In accordance with an aspect of the disclosure, a manual providing method of an electronic apparatus is provided. The manual providing method includes providing a display device with one of a plurality of manuals for an external device, obtaining a user response for the provided manual, determining an understanding level for the manual based on the obtained user response, and substituting the provided manual with another manual among the plurality of manuals according to the understanding level, wherein the plurality of manuals include a general manual, a detailed manual, and a simple manual.

In accordance with another aspect of the disclosure, an electronic apparatus is provided. The electronic apparatus includes a communication interface, a memory, and a processor configured to control the communication interface to provide a display device with one of a plurality of manuals for an external device, obtain a user response for the provided manual, determine an understanding level for the manual based on the user response, and substitute the manual with another manual among the plurality of manuals according to the understanding level, and the plurality of manuals include a general manual, a detailed manual, and a simple manual.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 is a view to describe a plurality of manuals according to an embodiment of the disclosure;

FIGS. 13 and 14 are views to describe an electronic apparatus for determining a reproduction starting point of a substitute manual according to various embodiments of the disclosure;

FIGS. 15, 16, and 17 are views to describe an electronic apparatus for receiving a manual transmission command from the display device according to various embodiments of the disclosure;

Throughout the drawings, it should be noted that like reference numbers are used to depict the same or similar elements, features, and structures.

DETAILED DESCRIPTION

Figure 1:
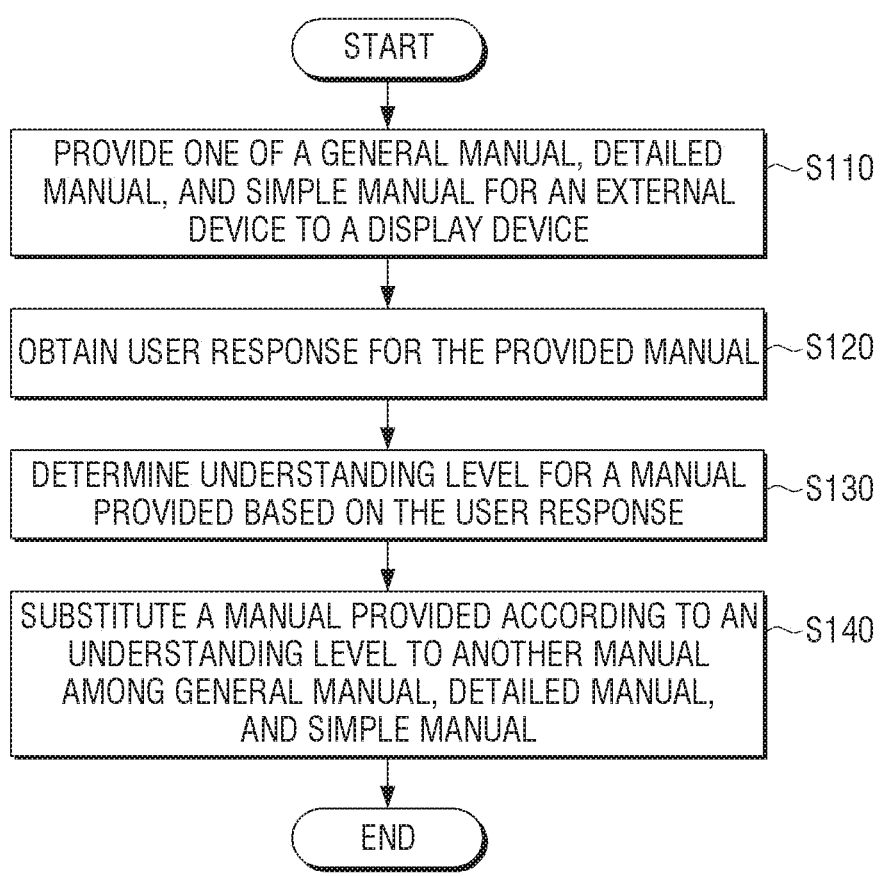
FIGS. 1, 2, 3, 4, 5, and 6 are flow charts to describe a method for providing a manual of an electronic apparatus according to various embodiments of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this document, the expressions "have," "may have," "including," or "may include" may be used to denote the presence of a feature (e.g., a numerical value, a function, an operation), and does not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one of A, (2) at least one B, (3) at least one A and at least one B all together.

The terms such as "first," "second," and so on may be used to describe a variety of elements, but the elements may not be limited by these terms. The terms are labels used only for the purpose of distinguishing one element from another.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it can be understood that there is no other element (e.g., a third element) between the other elements.

The expression "configured to" can be used interchangeably with, for example, "suitable for," "having the capacity to," "designed to," "adapted to," "made to," or "capable of" The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processing unit (CPU) or application processor (AP)) that can perform the corresponding actions by executing one or more software programs stored in the memory device.

In this disclosure, the term user may refer to a person who uses an electronic apparatus or an apparatus (e.g., artificial intelligence electronic apparatus) that uses an electronic apparatus.

Hereinafter, the embodiments will be described in a greater detail with reference to the drawings.

Figure 2:
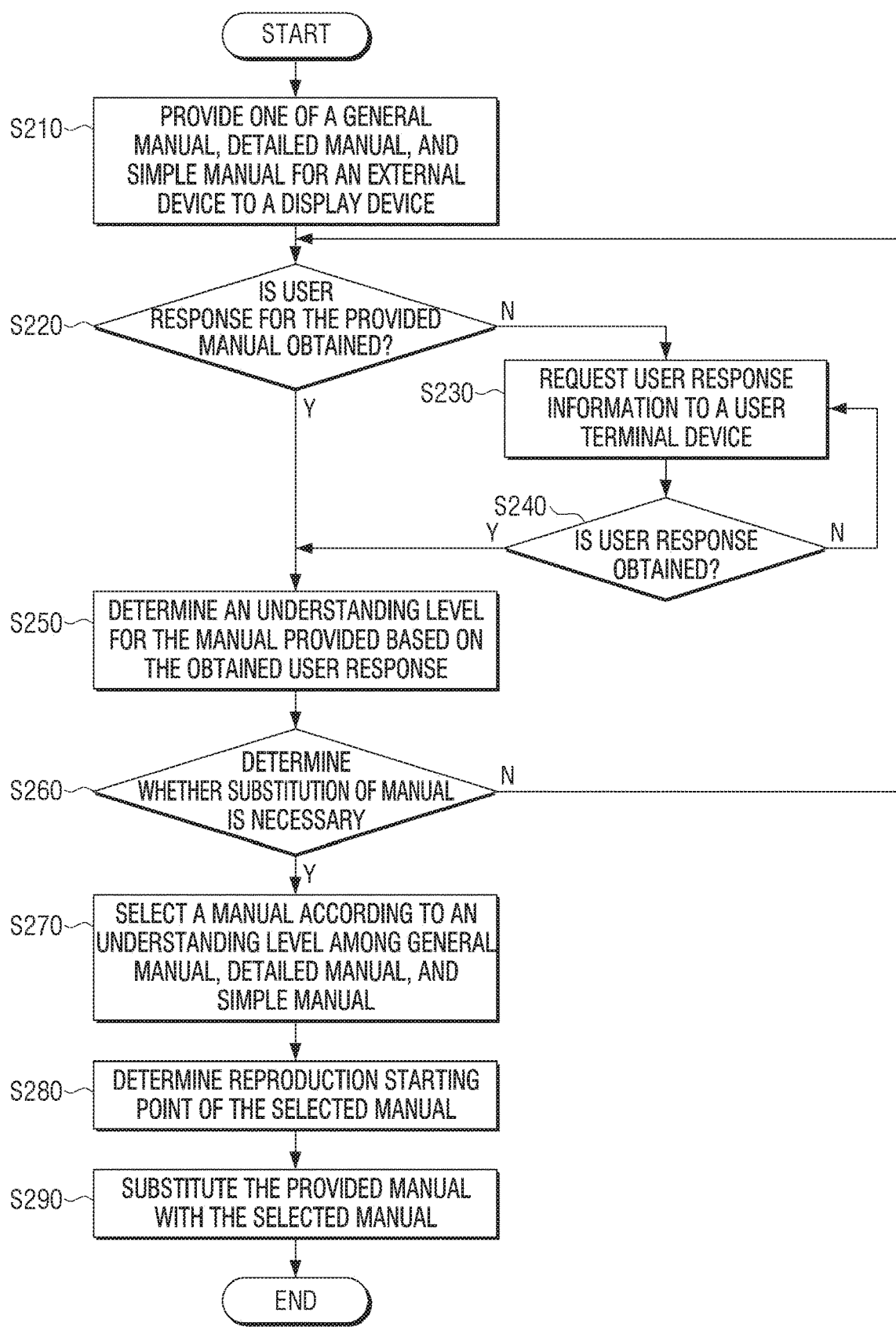

FIGS. 1 and 2 are flow charts to describe a method for providing a manual of an electronic apparatus according to various embodiments of the disclosure.

Referring to FIGS. 1 and 2, a method for providing a manual may provide a display device with one of a general manual, a detailed manual, and a simple manual for an external device in operations S110 and S210.

The user response to the provided manual can be obtained in operations S120 and S220. The user response indicates the feedback information of the user who viewed or listened to the provided manual. The user response may include user voice information or image information for the provided manual. The user voice information may include voice information uttered by a user listening to or viewing the provided manual, and the user image information may include facial expression information of the user or gesture information (or pose information) of the user, such as a user listening to or viewing the provided manual.

If a user response is not obtained in operation S220-N, user response information can be requested to the user terminal device in operation S230. In this case, the user terminal device receiving the user response request information can provide voice information requesting the user response to the user in operation S240. The user terminal device may be a display device that is providing a manual, but this is merely exemplary. The user terminal device may be an electronic apparatus such as a cellular phone, a smart phone, a TV, a monitor, an air conditioner, a refrigerator, and a washing machine. For example, the user terminal device, based on the received user response request information, may provide the user with a voice such as "how do you feel about the manual?" "did you do it well as the manual?". In response, the user terminal device may receive response information from the user. For example, the user terminal device can obtain voice information "no, it is difficult" from a user, or capture a facial expression or gesture of the user. The user terminal device receiving the user response request information may capture the user and transmit the captured image information to the electronic apparatus.

When the electronic apparatus obtains the user response information in operation S240-Y, the electronic apparatus may determine the understanding level for the manual provided based on the obtained user response in operation S250. When the electronic apparatus does not obtain the user response information in operation S240-N, the electronic apparatus may request the user response information to the user terminal device again in operation S230.

Then, the understanding level for a manual provided on the basis of the user response can be determined in operations S130 and S250. The understanding level refers to the degree of understanding of the user with respect to the manual, which indicates the degree to which the user recognizes and accepts the content of the manual. The understanding level indicates whether more or less information is recognized than the information contained in the content of the manual provided to the user. The understanding level can be divided into a high level, a neutral level, and a low level.

The high level means the understanding of the user for the manual is high, and indicates that the user is identified to recognize more information than the information contained in the content displayed on the display device. For example, if a step A out of steps A, B, and C in a manual is being provided to the display device, when the user response of "I completed step B" is received, the user's understanding level can be determined to be a high level. If the user's understanding level is high level, the manual provided to the display device can be substituted with another manual. At this time, the substitute manual may include a small amount of information summarizing the manual information provided to the display device, and the user may obtain the manual content information within a time faster than the previously provided manual.

The neutral level represents that an understanding level of the user for the manual is neutral, and indicates the understanding level when it is determined that the user recognizes information corresponding to the information included in the content displayed on the display device. For example, if a step A out of steps A, B, C included in the manual is provided to the display device, and the user response of "I completed step A" is received, the user's understanding can be determined to be a neutral level. If the user's understanding level is a neutral level, the manual provided to the display device may continue to be provided to the user.

Finally, the low level means that the understanding level of the user for the manual is low level and indicates the user's understanding when it is determined that the user recognizes less information than the information contained in the content displayed on the display device. For example, if a step A out of steps A, B, and C of the manual is provided to the display device, and the user response "I don't know" is received, the user's understanding level can be determined to be a low level. If the user's level of understanding is low, the manual provided to the display device can be substituted with another manual. In this case, the substitute manual may include a large amount of information in detail in the manual information provided to the display device.

Based on the obtained understanding level, a determination can be made as to whether substitution of the manual is necessary in operation S260. Specifically, if the determined understanding is at a low level or a high level, it may be determined that substitution of the manual is necessary. In addition, if the determined understanding level is a neutral level, a manual that is identical with the manual provided to the display device may be provided without substitution of the manual. However, this is merely exemplary, and if the determined understanding level is a neutral level, it may be determined that substitution of the manual is necessary.

In accordance with the understanding level, the provided manual may be substituted with one of the general manual, detailed manual, and a simple manual in operation S140.

According to the determined understanding level, a general manual, detailed manual, and simple manual may be selected as a substitute manual in operation S270. Prior to transmitting the substitute manual, the substitute manual may be selected in consideration of the manual transmitted to the display device. A specific description will be described with respect to FIG. 4.

The controlling method may determine the reproduction starting point of the selected manual in operation S280. The reproduction starting point of the manual selected based on the state information of an external device may be determined. A specific description will be given with respect to FIG. 6.

If the content provided to the display device is a general manual, and the understanding level is determined to be a high level, the substitute manual may be determined to be a simple manual. Conversely, if the content provided to the display device is a general manual, and the understanding level is determined to be a low level, the substitute manual may be determined to be the detailed manual.

The provided manual may be substituted with a selected manual in operation S290. In this case, the selected manual and the information on the reproduction starting point may be transmitted to the display device, to substitute the manual provided to the display device. To be specific, the address information corresponding to the selected manual and the information on the reproduction starting point may be provided to the display device to substitute the provided manual.

As another embodiment, the selected manual may be transmitted to the display device by streaming. In this case, the data from the determined reproduction starting point among the entire reproduction section of the selected manual may be streamed on the display device.

Figure 3:
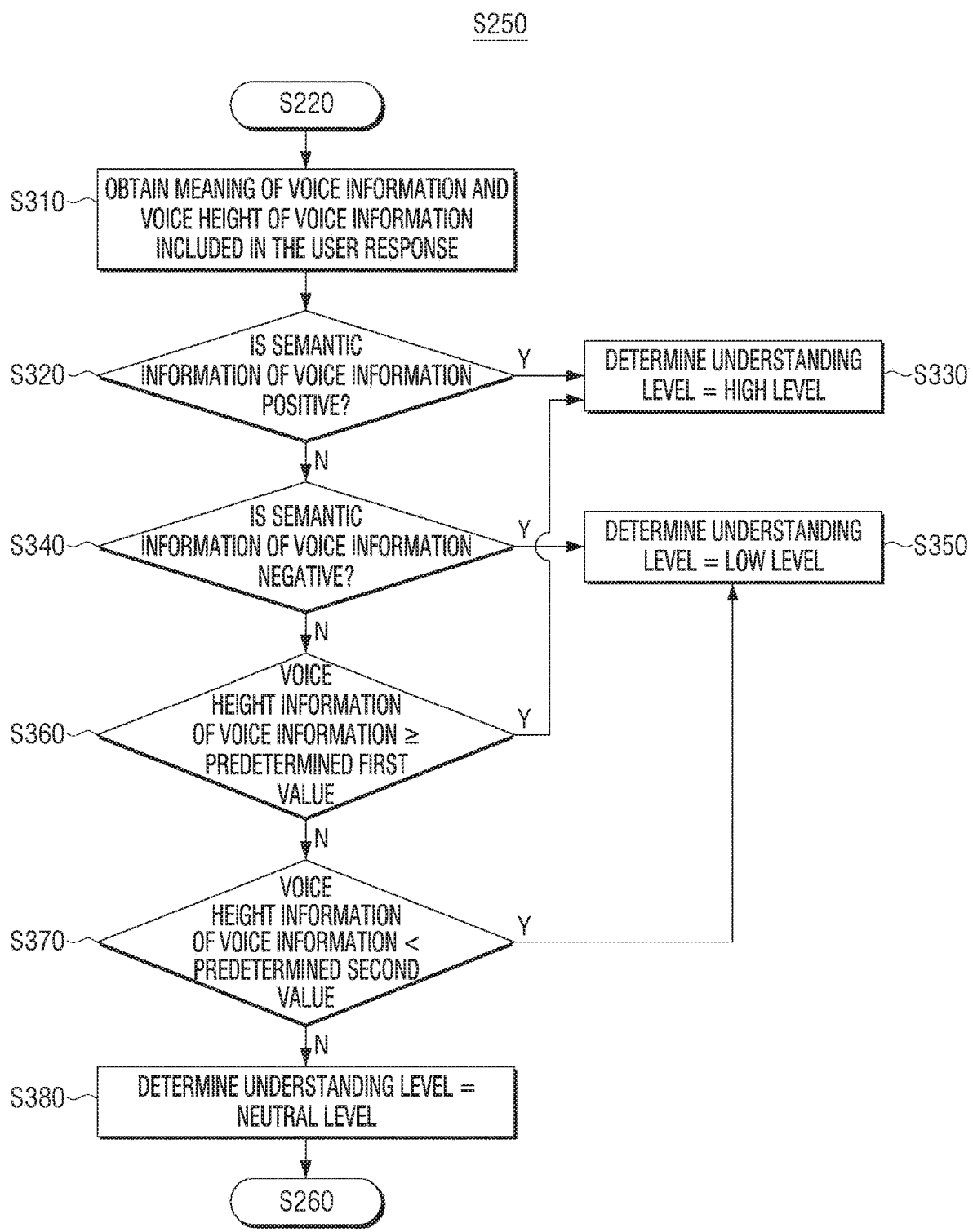

FIG. 3 is a view to describe a method for providing a manual according to an embodiment of the disclosure. Specifically, FIG. 3 is a view to describe S250 of FIG. 2 in greater detail.

Referring to FIG. 3, after the user response for the provided manual is obtained in operation S220, semantic information of the voice information and height information of the voice information included in the user response may be obtained in operation S310.

By using the semantic information and height information of the obtained voice information, the understanding level may be determined.

When it is determined that the semantic information of the user voice information is positive in operation S320, it may be determined that the understanding level is a high level in operation S330. However, if it is determined that the semantic information of the user voice information is not positive in operation S320, it may be determined whether the semantic information of the user voice information corresponds to negative in operation S340.

When it is determined that the semantic information of the user voice corresponds to negative in operation S340-Y, it may be determined that the understanding level is a low level in operation S350. Conversely, if it is determined that the semantic information of the user voice information does not correspond to negative in operation S340-N, that is, the semantic information of the user voice information does not correspond to positive and negative, the understanding level may be determined based on the voice height information of the user voice information.

When the information of the voice height of the user voice information is greater than or equal to a predetermined first value in operation S360, it may be determined that the understanding level is the high level. Conversely, when the information on the voice height of the user voice information is less than a predetermined first value in operation S360, it may be determined that the voice height information of the user voice information is less than a predetermined second value in operation S370.

When the voice height information of the user voice information is less than a predetermined second value in operation S370, it may be determined that the understanding level is a low level in operation S350. Conversely, when the voice height information of the user voice information is greater than or equal to a predetermined second value, it may be determined that the understanding level is a neutral level in operation S380.

Figure 4:
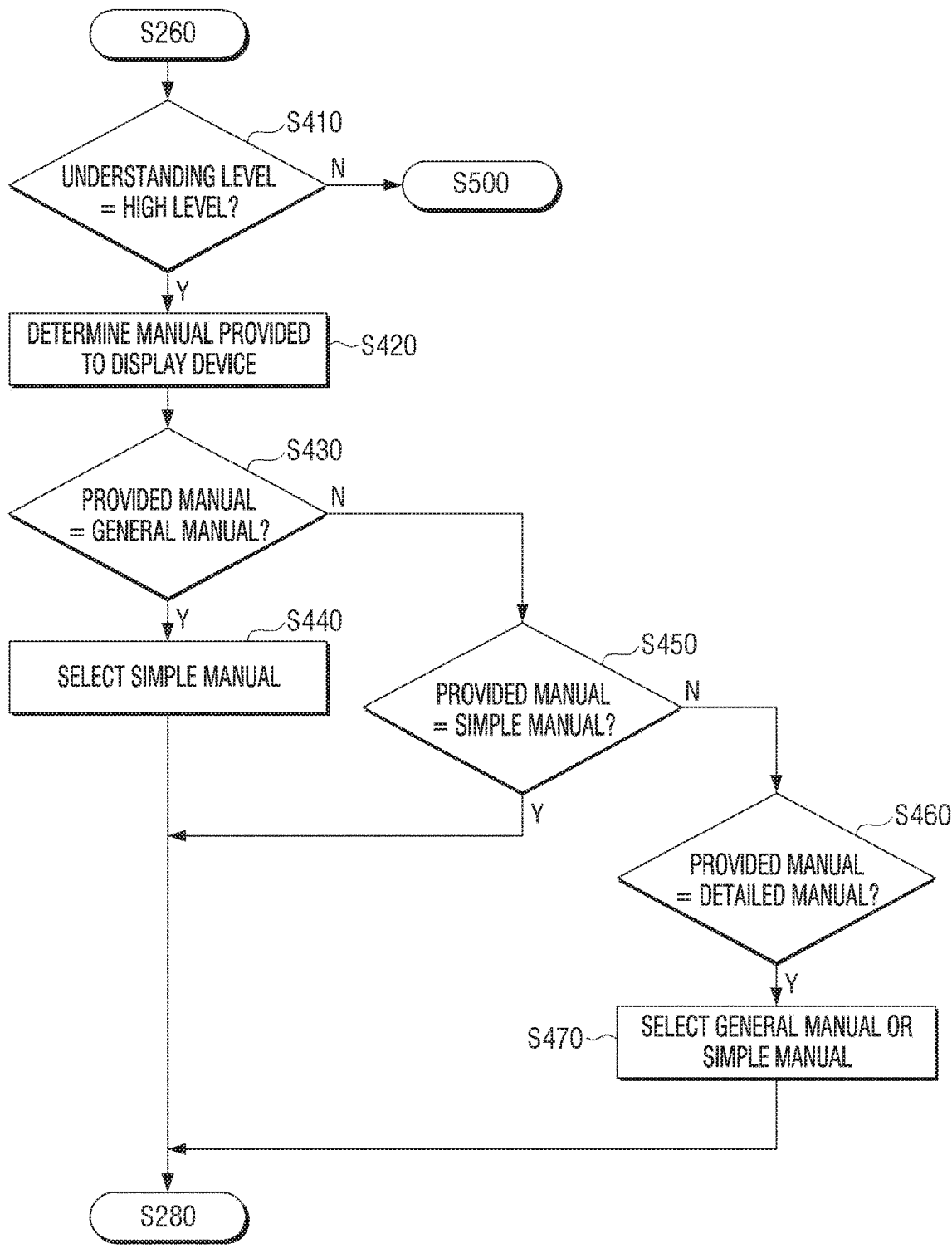
Figure 5:
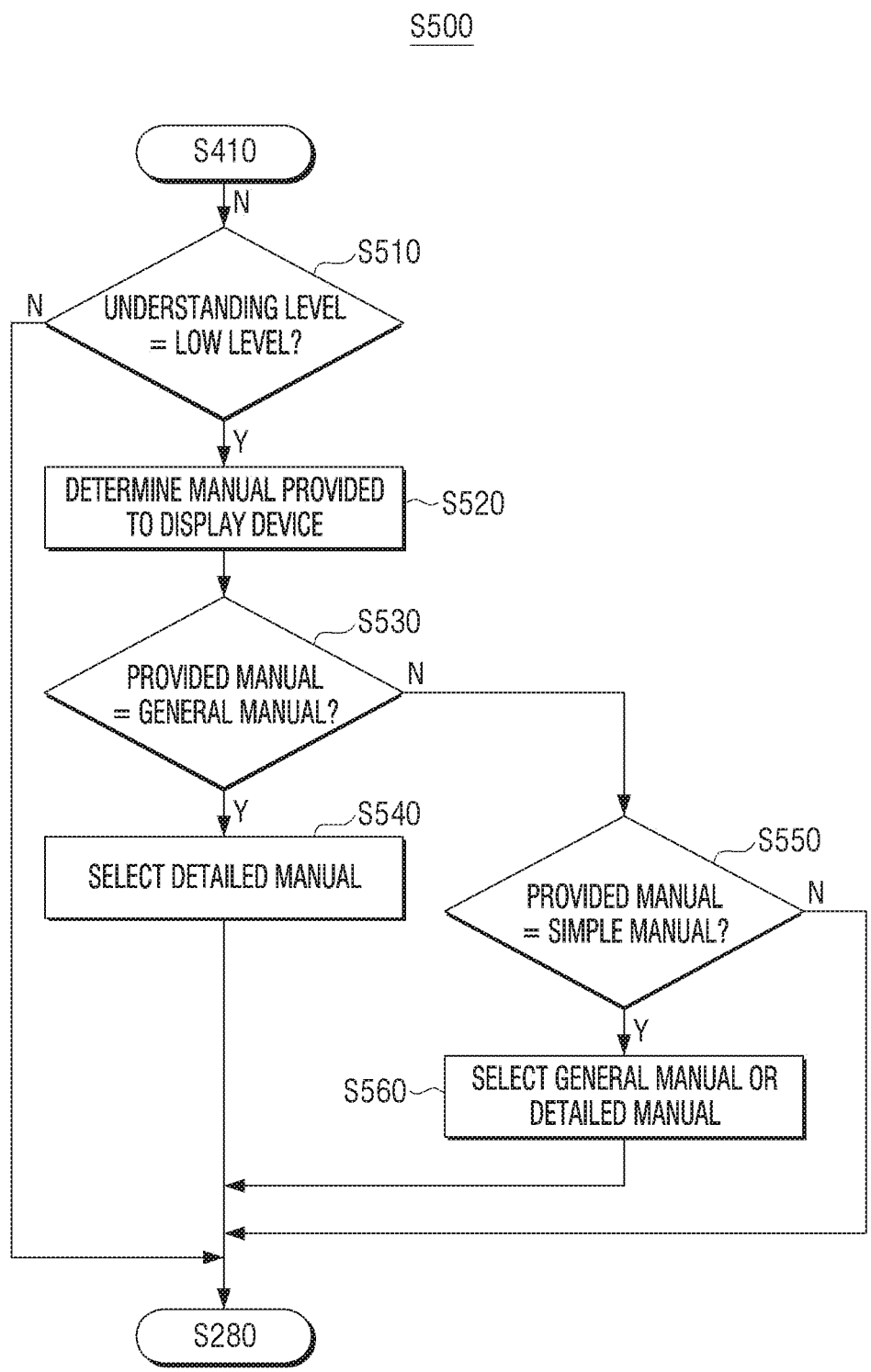

FIGS. 4 and 5 are views to specifically describe the step S270 of FIG. 2 according to various embodiments of the disclosure. When it is determined that substitution of the manual provided to the display device is deemed necessary based on the understanding level determined by the method of FIG. 3, the figures describe a method for selecting a manual to be substituted.

Referring to FIG. 4, the method for providing a manual may determine whether the determined understanding level corresponds to a high level in operation S410. When the determined understanding level corresponds to the high level in operation S410-Y, the manual provided to the display device, that is, the manual reproduced in the display device may be determined in operation S420.

It may be determined whether the manual provided to the display device corresponds to the general manual in operation S430. When the manual provided to the display device corresponds to the general manual in operation S430-Y, the simple manual may be selected as the substitute manual in operation S440.

If the manual provided to the display device is not a general manual, it may be determined whether the provided manual corresponds to a simple manual in operation S450. If the manual provided to the display device corresponds to the simple manual (i.e., if the understanding level of the manual corresponds to the high level and the manual reproduced on the display device corresponds to a simple manual), the simple manual that has been already provided becomes a substitute manual and, a separate manual may not be selected in operation S450-Y. If the provided manual does not correspond to a simple manual in operation S450-N, it is possible to determine whether the provided manual corresponds to a detailed manual in operation S460. In this case, if the provided manual corresponds to a detailed manual in operation S470, a general manual or a simple manual can be selected in operation S470.

In operation S410, if the understanding level does not correspond to the high level, the operations will be described with reference to FIG. 5.

Referring to FIG. 5, when the understanding level does not correspond to the high level, it may be determined whether the understanding level corresponds to the low level in operation S510.

When the understanding level corresponds to the low level, the manual provided to the display device may be determined in operation S520.

In operation S530, it is possible to determine whether the manual provided to the display device corresponds to a general manual. If the manual provided to the display device corresponds to the general manual in operation S530-Y (i.e., when the understanding level is a low level and the manual provided to the display device corresponds to a general manual), a detailed manual can be selected in operation S540. If the manual provided to the display device is not a general manual in operation S530-N, it is possible to determine whether the manual provided to the display device is a simple manual in operation S550. If the manual provided to the display device is a simple manual in operation S550-Y (i.e., when the understanding level is low level and the manual provided to the display device is a simple manual), a general manual or a detailed manual can be selected in operation S560. If the manual provided to the display device is not a simple manual in operation S550-N (i.e., if the manual provided to the display device is a detailed manual), the detailed manual, which has been already provided, becomes a substitute manual. Thus, the detailed manual which has been provided may become a substitute manual without selecting a separate manual in operation S550.

Figure 6:
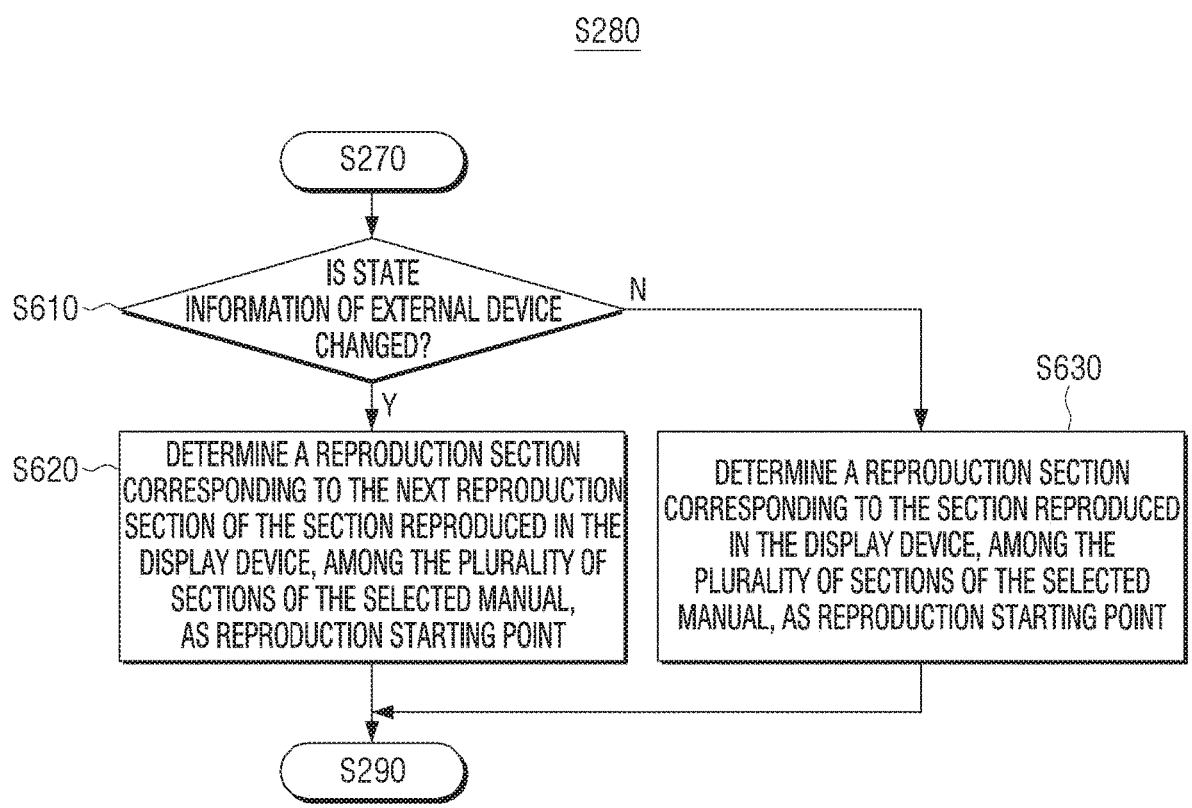

FIG. 6 is a view to specifically describe step S280 of FIG. 2 according to an embodiment of the disclosure.

Referring to FIG. 6, the method for providing a manual may include determining whether state information of the external device is changed in operation S610. For this purpose, state information of the external device may be received from the external device. The external device is an electronic apparatus described in the manual, and may be an electronic apparatus included in a content of the manual.

When a manual corresponding to the external device is displayed in the display device, the external device can determine the state of the external device and transmit the determined state information of the external device to the electronic apparatus. The state information of the external device refers to the information of the components (hardware) or software of the external device necessary to perform the functions of the external device. For example, if the external device is an air conditioner, whether power is connected, whether a filter is provided, air vent state information, outdoor unit temperature, pairing with a user terminal device, or the like, can be state information of the air conditioner.

When it is determined that the state information of the external device is changed after the manual is transmitted to the display device in operation S610, a reproduction section, among a plurality of sections of the selected substitute manual, corresponding to the next reproduction section of the section reproduced in the display device may be determined as a reproduction starting point in operation S620.

In addition, in order for the next section of the section reproduced in the display device to be displayed on the display device, the next section of the section reproduced by the display device among the plurality of sections is set as a reproduction section, and the reproduction starting point of the set reproduction section can be determined as the starting point of reproduction of the substitute manual.

If it is determined that the state information of the external device is not changed in operation S610, it is possible to set a reproduction starting point corresponding to the reproduction section in the display device among the plurality of sections of the selected substitute manual in operation S630. That the state information of the external device is not changed means that the state of the external device is not changed so as to correspond to the section reproduced in the display device. In this regard, the already reproduced section may be set as a reproduction section of the substitute manual so that the selected substitute manual reproduces the section reproduced in the display device again, and set the starting point of the set reproduction section as the starting point of the substitute manual.

As described above, information on section of the manual reproduced in the display device is necessary to determine the reproduction starting point and the electronic apparatus may receive information on the section information of the reproduced manual from the display device.

FIG. 6 illustrates a method of determining a reproduction point of the selected manual based on the state information of the external device after the step S270 of FIG. 2, i.e. after selecting one of a general manual, a detailed manual, and a simple manual on the basis of the understanding level. In some cases, it is possible to determine the reproduction point of the substitute manual in step S270, which replaces the manual based on the understanding level of the user. For example, if the manual which has been reproduced on the display device includes a plurality of sub-content, the step of selecting the substitute manual may be the step of selecting one of the plurality of sub-content included in the substitute manual. In addition, in that the plurality of sub-content included in the substitute manual is sequentially reproduced, the step of selecting one of the plurality of sub-contents included in the substitute manual can be considered to determine the reproduction point of the manual.

Figure 7:
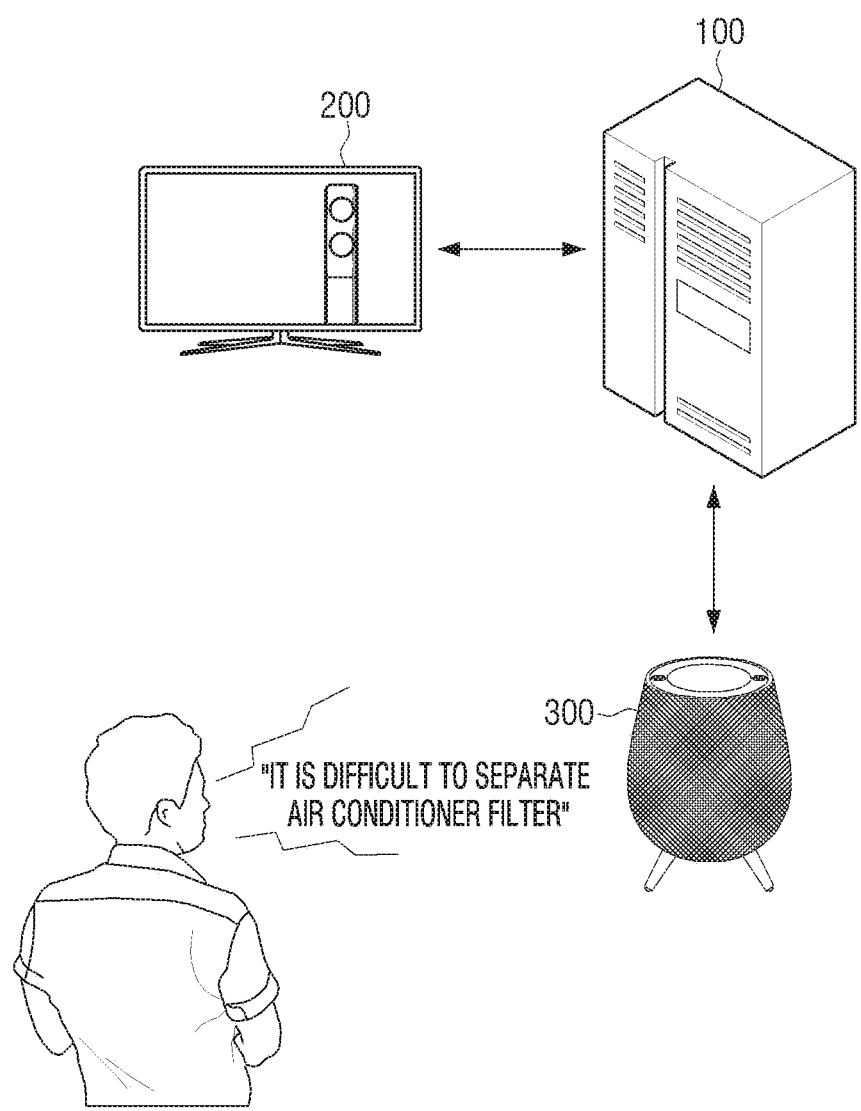
FIG. 7 is a view to describe a content providing system for providing a content according to a user's understanding level according to an embodiment of the disclosure.

FIG. 7 is a view to describe a manual providing system for providing a manual according to a user's understanding level according to an embodiment of the disclosure.

Referring to FIG. 7, a manual providing system 1000 may include the electronic apparatus 100, the display device 200, and a user terminal device 300.

The electronic apparatus 100 may provide a manual including various contents to the display device 200. In the disclosure, the content means a character, a figure, a color, a drawing, sound, voice, or combination thereof, and means information provided as a text, an image, a video, voice, or a combination thereof.

The electronic apparatus 100 may provide a manual stored in the electronic apparatus 100 to the display device 200, and may provide the manual received from an external device (not shown) to the display device 200. In addition, although the electronic apparatus 100 may directly transmit the manual to the display device 200, the electronic apparatus 100 may transmit the location information (for example, uniform resource locator (URL) information) stored in the manual to the display device 200.

The display device 200 may provide a manual received from the electronic apparatus 100 to a user.

The display device 200 may be various user terminal devices including a display and may be a notebook, a mobile phone, a smartphone, a tablet personal computer (PC), a kiosk, or the like, as well as a television (TV) and a monitor.

The user terminal device 300 may obtain the user's voice information or image information about the manual provided by the display device 200. The user's voice information is information on the sound generated by the user who received the manual provided by the display device 200 and can include a non-verbal sound, such as a sigh, cheer, admiration as well as a verbal sound, such as a user utterance. In addition, the image information of the user may include a user's facial expression, gesture, or pose.

The user terminal device 300 may transmit the obtained user voice information or image information to the electronic apparatus 100. For this purpose, the user terminal device 300 may include a microphone or a camera.

Referring to FIG. 7, the user terminal device 300 is illustrated as a speaker, but is not limited thereto, and a device including a microphone or a camera may be the user terminal device 300 of FIG. 7.

The electronic apparatus 100 may determine whether the manual provided by the display device 200 needs to be substituted based on the user voice information or image information received from the user terminal device 300.

The electronic apparatus 100 may determine the understanding level of the user about the manual from the user voice information or the image information, and determine whether the corresponding manual is substituted based on the determined understanding level. Based on user voice information or image information, the electronic apparatus 100 can determine that the manual provided to the user should be substituted if the user's understanding level of the manual is lower or higher than the preset range.

When it is determined that the manual provided to the user needs to be substituted, the electronic apparatus 100 may provide a content that is different from the manual provided to the user based on the determined understanding level.

According to another embodiment of the disclosure, the display device 200 and the user terminal device 300 may be implemented as a single device. The display device 200 may obtain the user's voice information or image information for the content provided by the display device 200, and provide the information to the electronic apparatus 100. In this case, the electronic apparatus 100 may receive user voice information from a remote controller (not shown) for controlling the display device 200, as well as the display device 200.

The electronic apparatus 100 may determine whether the content provided by the display device 200 is suitable to a user through voice information or image information of a user received from the display device 200 or a remote controller (not shown) for controlling the display device.

Figure 8:
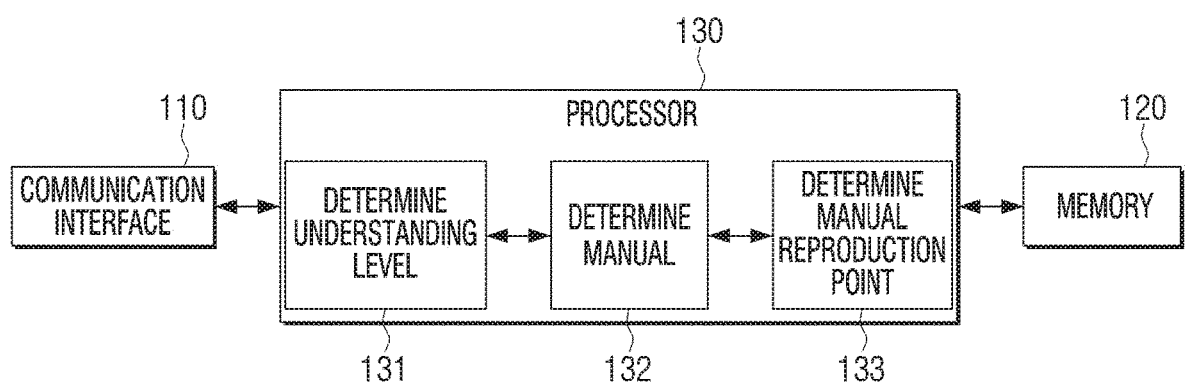
FIG. 8 is a block diagram illustrating a configuration of an electronic apparatus according to an embodiment of the disclosure.

FIG. 8 is a block diagram illustrating a configuration of an electronic apparatus 100 according to an embodiment of the disclosure.

Referring to FIG. 8, the electronic apparatus 100 includes a communication interface 110, a memory 120, and a processor 130.

The communication interface 110 is a component for the electronic apparatus 100 to communicate with the display device 200 and the user terminal device 300. Through the communication interface 110, the electronic apparatus 100 may provide content or information about content to the display device 200 and may receive user voice information or image information from the user terminal device 300.

The communication interface 110 may perform communication with another external device (not shown as well as the display device 200 and the user terminal device 300. The communication interface 110 may receive state information of an external device (not shown) through communication with an external device (not shown).

The communication interface 110 may include various communication modules such as a wired communication module (not shown), near-field wireless communication module (not shown), wireless communication module (not shown), or the like.

The wired communication module is a module for performing communication with an external device (not shown) according to a wired communication method such as wired Ethernet. The near field communication module is a module for performing communication with an external terminal (not illustrated) positioned at a near distance through near field communication methods such as Bluetooth (BT), Bluetooth low energy (BLE), ZigBee, or the like. The wireless communication module is a module which communicates by being connected to an external network according to a wireless communication protocol, such as wireless fidelity (Wi-Fi), Institute of Electrical and Electronics Engineers (IEEE) and the like. The wireless communication module may further include a mobile communication module which is connected to a mobile communication network according to various mobile communication standards such as 3rd generation (3G), 3rd generation partnership project (3GPP), long term evolution (LTE), LTE advanced (LTE-A), 5th generation (5G) networks, or the like, to perform communications.

The memory 120 is a component for storing various programs, data, or the like, that are necessary for operating the electronic apparatus 100. The memory 120 may be implemented as a non-volatile memory, a volatile memory, a flash memory, a hard disk drive (HDD), a solid state drive (SSD), or the like. The memory 120 is accessed by the processor 130 and reading/writing/modifying/deleting/updating of data by the processor 130 may be performed. In the disclosure, the term memory may include the memory 120, read-only memory (ROM) in the processor 130, random access memory (RAM), or a memory card (for example, a micro secure digital (SD) card, and a memory stick) mounted to the electronic apparatus 100.

The memory 120 may store various content provided to the display device 200 or information on the content. The information on the contents may include address information of the content where the content is stored, content reproduction history information, content section information, or the like.

The memory 120 may include an artificial intelligence (AI) agent. The AI agent is a dedicated program to provide AI-based services (e.g., voice recognition services, secretarial services, translation services, search services, etc.) and may be executed by existing general-purpose processors (e.g., a central processing unit (CPU) or separate AI-only processors (e.g., a graphics processing unit (GPU)). When the AI agent is executed by the aforementioned processor, the AI agent may analyze user voice information or image information, obtain the user's emotion or understanding level, and provide a response to the obtained emotion or understanding level.

For this purpose, the memory 120 may include at least one configuration (or module) for obtaining the user's emotion through information on the user's expression, degree of attitude, or the like, included in the user's image.

The memory 120 may include a plurality of configurations (or modules) constituting the dialogue system. Here, the dialogue system is a program for performing voice recognition for the user's voice and providing a response thereto. The dialogue system will be further described with reference to FIG. 9.

Figure 9:
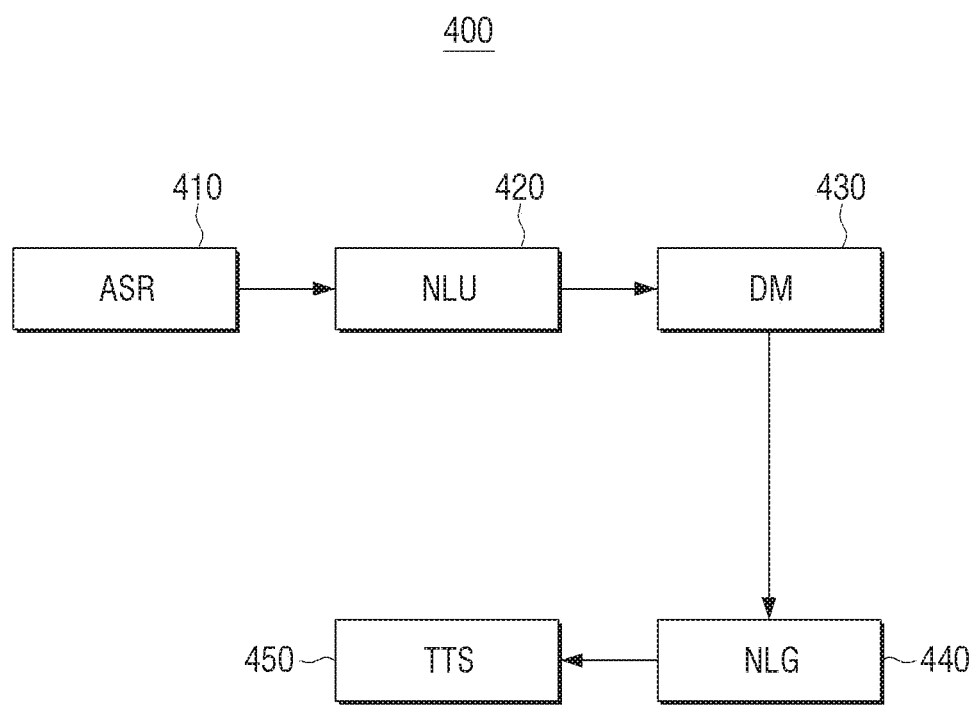
FIG. 9 is a block diagram illustrating a dialogue system of an electronic apparatus according to an embodiment of the disclosure.

FIG. 9 is a block diagram illustrating a dialogue system of an electronic apparatus according to an embodiment of the disclosure.

Referring to FIG. 9, a dialogue system 400 is a configuration for performing a dialogue through a natural language with a user. The dialogue system 400 may be stored in the memory 120 of the electronic apparatus 100 according to an embodiment. However, this is merely exemplary, and at least one configuration included in the dialogue system 400 may be included in an external device (e.g., the user terminal device 300, another server (not shown)). Some configurations of the dialogue system 400 may be included in the user terminal device 300.

Referring to FIG. 9, the dialogue system 400 may further include an automatic speech recognition (ASR) module 410, a natural language understanding (NLU) module 420, a dialogue manager (DM) module 430, a natural language generator (NLG) module 440, and a text to speech (TTS) module 450. The dialogue system 400 may further include a knowledge base (not shown).

The ASR module 410 may convert user input received from the user terminal device 300 into text data. For example, the ASR module 410 may include a speech recognition module. The speech recognition module may include an acoustic model and a language model. For example, the acoustic model may include information related to speech, and the language model may include information on unit phoneme information and a combination of unit phoneme information. The speech recognition module may convert the user utterance into text data using the information related to speech and information on the unit phoneme information. Information about the acoustic model and language model may be stored in, for example, an automatic speech recognition database (ASR DB).

The natural language understanding module 420 may recognize the intention of a user by performing syntactic analysis or semantic analysis. Grammatical analysis may divide the user input in grammatical units (e.g., words, phrases, morphemes, or the like), and grasp which grammatical elements the divided units have. The semantic analysis may be performed using semantic matching, rule matching, formula matching, or the like. Accordingly, the natural language understanding module 420 may acquire domain or intent for the user input.

The natural language understanding module 420 may determine user intention and parameters using the matching rule divided into a domain and an intention. For example, the natural language understanding module 420 may include the one domain (e.g., air conditioner, TV, or the like) may include a plurality of intents (e.g., manual searching, manual reproduction, or the like), and one intention may include a plurality of parameters (e.g., search target, reproducing device, or the like). The matching rules may be stored in a natural language understanding database (NLU DB).

The natural language understanding module 420 may grasp the meaning of a word extracted from a user input using a linguistic characteristic (e.g., a grammatical element) such as a morpheme or a phrase, and determine a user intention by matching the grasped meaning with the domain and the intention. For example, the natural language understanding module 420 may determine the user's intention by calculating how many words extracted from user input are included in each domain and intention. The natural language understanding module 420 may determine the parameters of the user input using words that become a basis for understanding the intent. The natural language understanding module 420 may determine the user's intention using the natural language recognition database (not shown) in which the linguistic characteristic for grasping the intention of the user input is stored.

A dialogue manager module 430 may determine whether the intention of a user grasped by the natural language understanding module 420 is clear. For example, the dialogue manager module 430 may determine whether the intention of the user is clear based on whether the parameter information is sufficient. The dialogue manager module 430 may determine whether the parameter grasped by the natural language understanding module 420 is sufficient to determine the user's understanding level of the content. The dialogue manager module 430 may perform feedback to request necessary information to the user if the user intension is not clear. For example, the dialogue manager module 430 may perform the feedback to request information about parameters for grasping the user intention. In addition, the dialogue manager module 430 may generate and output a message for checking a user inquiry including the text changed by the natural language understanding module 420.

The dialogue manager module 430 may include a content provider module (not shown). The content provider module may determine the understanding level based on the parameter and the intention grasped by the natural language understanding module 420 and generate information corresponding to the determined understanding level.

The dialogue manager module 430 may provide response information for the user voice using a knowledge base (not shown). The knowledge base is database in which various knowledge information are stored in a form of ontology such as a resource description framework (RDF), web ontology language (OWL), or the like.

The natural language generation module (NLG module) 440 may change the designated information into a text form. The information changed in the text form may be a form of natural language utterance. The designated information may be, for example, information about an additional input, information for guiding completion of an action corresponding to a user input, or information for guiding an additional input of a user (for example: feedback information for a user input). The information changed in the text form may be displayed on a display (not shown) or changed into a voice form by a text-to-speech (TTS) module 450.

The TTS module 450 may change the information of the text format to voice format information. The TTS module 450 may receive information of a text format from the natural language generation module 440, change the information of the text format into information of a voice format, and output the same through a speaker.

The natural language understanding module 420 and the dialogue manager module 430 may be implemented as one module. For example, the natural language understanding module 420 and the dialogue manager module 430 may be implemented as one module to determine the intention of the user and the parameter, and obtain a response corresponding to the determined user intention and the parameter.

The memory 120 may store content. The content may include a plurality of manuals for an external device (not shown). The manual for an external device (not shown) represents content including information necessary for a user to use, maintain, update or repair an external device, such as hardware, software, and system included in an external device (not shown) or an external device (not shown), a method of use, a problem solving method, and the like. The manual may be provided in the form of text, images, or voice, and may be provided in the form of combining some of the text, images, and voice.

A plurality of manuals for an external device (not shown) may include a general manual, a detailed manual, and a simple manual. The memory 120 may include the detailed manual and the simple manual corresponding to the general manual.

FIG. 10 is a view to describe a plurality of manuals according to an embodiment of the disclosure.

Referring to FIG. 10, a simple manual 1010, a general manual 1020, and a detailed manual 1030 are disclosed.

While the general manual 1020 may include content corresponding to a plurality of steps (step 1, step 2, and step 3) necessary for using, maintaining, updating, or repairing an external device (not shown), the simple manual 1010 and the detailed manual 1030 may include a content corresponding to a plurality of steps included in the general manual 1020.

The simple manual 1010 may include a smaller amount of sound information, text information, and image information than the general manual 1020 for at least one of a plurality of steps of step 1, step 2, and step 3 included in the simple manual 1010. The detailed manual 1030 may include a greater amount of sound information, text information, and image information than the general manual 1020 for at least one of a plurality of steps of step 1, step 2, and step 3 included in the detailed manual 1030.

Accordingly, the play time of at least one of the plurality of steps (step 1, step 2, and step 3) included in the simple manual 1010 can be shorter than the reproduction time of the corresponding step of the general manual 1020. In addition, the reproduction time of at least one of the plurality of steps (step 1, step 2, and step 3) included in the detailed manual 1030 may be shorter than the reproduction time of the corresponding step of the general manual 1020.

The simple manual 1010 or the detailed manual 1030 includes a plurality of steps of the general manual 1020, and thus the simple manual 1010 or the detailed manual 1030 may include points 1011 and 1013 corresponding to a particular point 1011 in the general manual 1020. At this time, the reproduction time of the particular point 1011 of the simple manual 1010 can be faster than the reproduction time of the particular point 1012 of the general manual 1020, and the reproduction time of the particular point 1013 of the detailed manual 1030 can be later than the reproduction time of the particular point 1012 of the general manual 1020.

The detailed manual 1020 may be a manual including an image captured at an angle other than the general manual 1010. For example, the detailed manual may include images captured at various angles of the external device, such as the back, side, top, bottom, etc. of an external device (not shown). In addition, the detailed manual 1020 may include an image that magnifies an image included in the general manual 1010.

The detailed manual 1020 may provide a user with more information, various information (for example, an image at another angle), detailed information (for example, a magnified image) than the general manual 1010.

The general manual 1020, the simple manual 1010, and the detailed manual 1030 are not always stored in the memory 120. The general manual 1020, the simple manual 1010, and the detailed manual 1030 are stored in an external electronic apparatus such as a content server (not shown), and address information of the general manual 1020, the simple manual 1010, and the detailed manual 1030 stored in the external electronic apparatus may be stored in the memory 120.

Referring back to FIG. 8, the processor 130 may be electrically connected to the memory 120 to control the overall operations and functions of the electronic apparatus 100. For example, the processor 130 may drive an operating system or application program to control hardware or software components connected to the processor 130, and may perform various data processing and operations. The processor 130 may also load and process commands or data received from at least one of the other components into volatile memory and store the various data in non-volatile memory.

For this purpose, the processor 130 may execute one or more software programs stored in a dedicated processor (e.g., embedded processor) for performing the operations or memory device and may be implemented as a general-purpose processor (for example: central processing unit (CPU) or application processor) capable of performing the corresponding operations.

In order to control the operations and functions of the electronic apparatus 100, the processor 130 may include an understanding determination module (or configuration) 131, a manual determination module (or configuration) 132, and a manual reproduction point determination module (or configuration) 133. Although the understanding determination module 131, the manual determination module 132, and the manual reproduction point determination module 133 may each be a separate configuration, at least two of the modules (or configurations) may be combined into a single module (or configuration).

The processor 130 may control the communication interface 110 to provide a content to the display device 200.

The processor 130 may control the communication interface 110 to provide one of a plurality of manuals for an external device to the display device 200. The plurality of manuals may include the general manual, the detailed manual, and the simple manual.

The processor 130 may obtain a user response to the provided manual. The processor 130 may communicate with the user terminal device 300 or the display device 200 to receive a user response to the manual. The user response may include user voice information or image information. The user voice information may include voice information corresponding to the user's utterance, and the user image information may include the user's facial expression information or the user's attitude information, or the like.

The processor 130 may determine a user's understanding of the manual based on the obtained user response. An understanding level indicates a degree of user's understanding of a content, and the understanding level may be divided into a high level, a neutral level, and a low level according to the degree of understanding. It is to be understood that this is merely exemplary, and may be divided into various steps depending on the user's settings or systems. Determination on the understanding level based on user response will be described in greater detail below in FIG. 12.

The processor 130 may use the state information of the external device to determine an understanding level of the manual. The external device represents an electronic apparatus included in the manual, and more specifically, the external device can be an electronic apparatus described in the content included in the manual. The state information of the external device indicates information related to the status of the external device while the manual is displayed on the display device 200. The state information of the external device refers to the state information of a component (hardware) or software of the external device necessary to perform the function of the external device. For example, when the external device is an air conditioner, whether power is connected, whether a filter is provided, air vent state information, outdoor temperature information, pairing with a user terminal device, or the like, can be state information of the air conditioner.

For this purpose, the processor 130 may receive state information of the external device from an external device (not shown). The state information of the external device may be generated at an external device, and the processor 130 may request state information of the external device to an external device (not shown). However, this is only one embodiment, and an external device (not shown) may periodically transmit state information of the external device to the electronic apparatus 100. According to another embodiment of the disclosure, if the processor 130 provides a manual to the display device 200, the processor 130 may request state information of the external device to an external device included in the manual provided to the display device 200, and an external device (not shown) receiving the request of the state information from the processor 130 may generate the state information of the external device and transmit the information to the processor 130.

The processor 130 may receive the state information of an external device from an external device that is a subject of the manual in order to determine an understanding level. For example, when the manual is related to an air-conditioner, the processor 130 may receive the state information of the air-conditioner.

The processor 130 may determine an understanding level based on the received state information of the external device. For example, if the state information of the external device is not changed for a predetermined period of time after providing the manual to the display device 200, the processor 130 may determine an understanding level to a low level. In addition, if the state information of the external device is changed for a predetermined time after providing the manual to the display device 200, the understanding level of the state of the external device can be determined to be a neutral level or a high level according to the degree of change of the state of the external device.

Regarding this, the processor 130 may determine whether it is necessary to substitute the manual provided to the display device 200 with another manual based on the determined understanding level. For example, when the understanding level is determined to be a low level or a high level, the processor 130 may determine that it is necessary to substitute the manual.

The processor 130 may determine a manual to be substituted (hereinafter, referred to as a substitute manual) by using a manual determination module 132. To be specific, the processor 130 may determine the substitute manual based on the manual provided to the display device 200 and the user's understanding level of the provided manual. In this case, the substitute manual may be one of a general manual, a detailed manual, and a simple manual.

If the user's understanding level is a high level and the manual reproduced by the display device 200 is not a simple manual, the processor 130 can determine the manual including information of a shorter reproduction time or a smaller amount of information than the manual provided by the display device 200 as the substitute manual. For example, if the user's understanding level is a high level and the manual reproduced on the display device is a general manual, the processor 130 may determine the simple manual as a substitute manual. In addition, if the user's understanding level is a high level and the manual reproduced in the display device is a detailed manual, the processor 130 can determine the general manual or the manual as a substitute manual.

If the user's understanding level is a low level and the manual provided to the display device 200 is a detailed manual, the processor 130 can determine the manual including a greater reproduction time or a greater amount of information than the manual provided by the current display device 200 as a substitute manual. For example, if the user's understanding level is a low level and the manual reproduced on the display device is a general manual, the processor 130 may determine the detailed manual as a substitute manual. In addition, if the user's understanding level is a low level and the manual reproduced in the display device is a simple manual, the processor 130 can determine the general manual or the detailed manual as a substitute manual.

The processor 130 may determine the reproduction section or reproduction starting point of the determined substitute manual. The processor 130 may use the manual reproduction point determination module 133.

The processor 130 may determine the reproduction starting point of the substitute manual based on the voice recognition result for the user voice information. If the voice information included in the user response includes the state information of the external device, the processor 130 can determine the state information of the external device based on the recognition result of the user voice information, and can determine the next section of the section corresponding to the state information of the external device during the reproduction section of the substitute manual as the reproduction starting point. For example, if the user utters "I removed an air conditioner filter," the processor 130 can determine that the state information of the external device is in a state that the air conditioner filter has been removed based on the result of the user voice recognition. In addition, the processor 130 can determine the next section of the section corresponding to the air conditioner filter removal step as the reproduction starting point. For this, the memory 120 may store time information for each section included in the manual, state information of an external device corresponding to each section, or the like.

In another embodiment of the disclosure, the processor 130 may determine a reproduction starting point of the substitute manual based on an understanding level obtained according to a voice recognition result for the user voice information. When the understanding level of the user is a low level, the processor 130 may set a section corresponding to the last reproduced section of the display device 200 to the reproduction section of the substitute manual, and determine the starting point of the set reproduction section as the reproduction starting point of the substitute manual. If the understanding level of the user is the neutral level or the high level, the processor 130 may set a section corresponding to the next section of the last reproduced section in the display device 200 to the reproduction section of the substitute manual, and determine the starting point of the set reproduction section as the reproduction starting point of the substitute manual.

The processor 130 may determine the reproduction starting point in the substitute based on the state information received from the external device.

If it is determined that the state information of the external device is changed after receiving the state information of the external device, and transmitting the manual to the display device 200, the processor 130 may set a section corresponding to the next section of the section reproduced by the display device during the plurality of sections of the substitute manual as the reproduction section. In addition, the processor 130 may determine a reproduction starting point of the set reproduction section as a reproduction starting point of the substitute manual. Accordingly, the display device 200 may provide the next reproduction section of the previously reproduced section to the user.

It may be determined that the state information of the external device is not changed after the manual is transmitted to the display device 200. That the state information of the external device is not changed means the state of the external device is not changed to correspond to the section reproduced in the display device and thus, the display device 200 needs to reproduce the section of the previously reproduced in the manual again. Accordingly, if it is determined that the manual is transmitted to the display device 200 and the state information of the external device is not changed, the processor 130 may set a section corresponding to the section reproduced by the display device among the plurality of sections of the substitute manual as the reproduction section. In addition, the processor 130 may determine a reproduction starting point of the set reproduction section as a reproduction starting point of the substitute manual.

As such, when the reproduction starting point is determined based on the state information of the external device, in that information on the section of the manual reproduced in the display device is necessary, the electronic apparatus 100 may receive information on the section information of the reproduced manual from the display device.

The processor 130 may determine a reproduction starting point in the substitute manual based on the content reproduction history information. For example, the processor 130 may skip a section including information reproduced for more than the predetermined number of times and determine a reproduction starting point of the substitute manual in consideration of the user's content reproduction history information.

The processor 130 may transmit the information on the reproduction starting point and the substitute manual to the display device 200 and substitute the manual provided to the display device 200. The processor 130 may provide the address information corresponding to the substitute manual and the information on the reproduction starting point to the display device 200 and substitute the provided manual.

In another embodiment of the disclosure, the processor 130 may transmit a manual to the display device 200 in a streaming manner. In this case, the processor 130 may stream the data from the determined reproduction starting point among the entire reproduction sections of the substitute manual to the display device 200.

It has been described that the simple manual 710, the general manual 720, and the detailed manual 730 including a plurality of steps (step 1, step 2, and step 3) are stored in the memory 120, but it is not limited thereto.

Each of the general manual, detailed manual, and the simple manual may be divided by a plurality of sub-contents sequentially reproduced, and the memory 120 may store a plurality of sub-contents.

Figure 11:
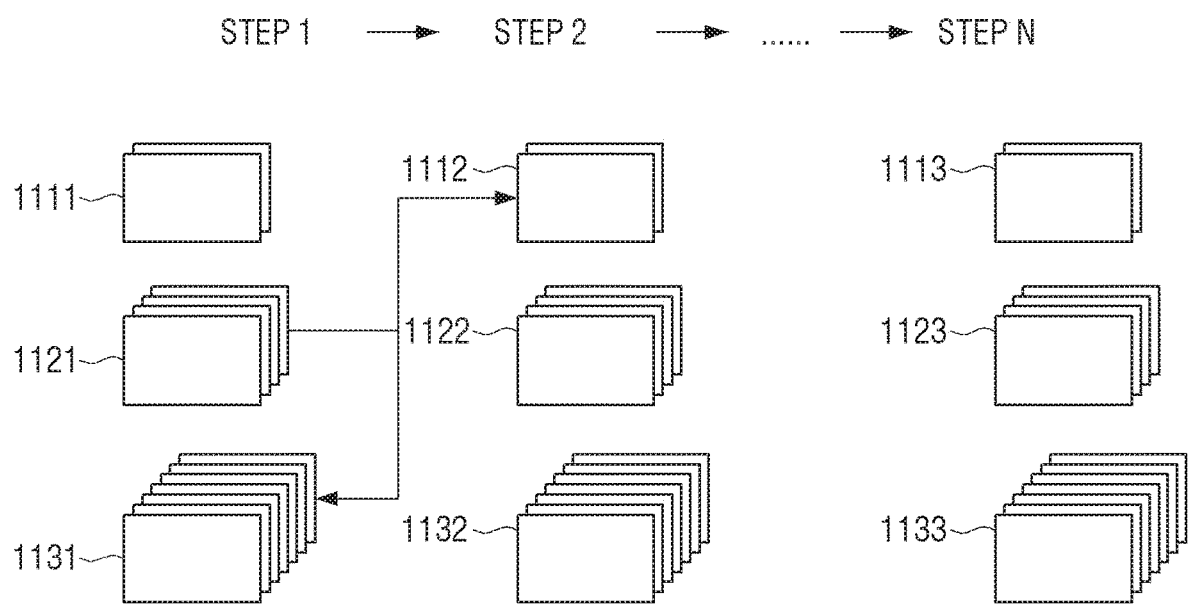
FIG. 11 is a view to describe a display device for selecting a sub-content to be reproduced among a plurality of sub-contents related to an external device according to an embodiment of the disclosure.

FIG. 11 is a view to describe a display device for selecting a sub-content to be reproduced among a plurality of sub-contents related to an external device according to an embodiment of the disclosure.

Referring to FIG. 11, it is assumed that a plurality of steps (step 1, step 2, . . . , step N) are necessary to use, maintain, update or repair the external device. In this case, a general manual, a detailed manual, and a simple manual can be separately stored in the memory 120 according to a plurality of steps. For example, in the memory 120, the simple manual may be divided into a plurality of sub-content 1111, 1112, and 1113 according to a plurality of steps, and may be stored, the general manual may be divided into a plurality of sub-content 1121, 1122, and 1123 according to a plurality of steps, and stored, and the detailed manual may be divided into a plurality of sub-content 1131, 1132, and 1133 according to a plurality of steps and stored.

The processor 130 may transmit one of a plurality of sub-contents 1111, 1112, 1113, 1121, 1122, 1123, 1131, 1132, and 1133 stored in the memory 120 to the display device 200.

While the transmitted sub-content is being reproduced in the display device, or after the transmitted sub-content is reproduced, the processor 130 may receive a user response for the reproduced sub-content from the user terminal device 300.

As described in FIG. 8 above, the processor 130 may determine a user's understanding level of the reproduced sub-content based on the received user response, and may determine a substitute manual based on the understanding level. For example, if the content provided to the display device 200 is a general manual and the understanding level is determined to be a high level, the processor 130 may determine the alternate manual as a simple manual. Conversely, if the content provided to the display device 200 is a general manual and the understanding level is determined to be a low level, the processor 130 can determine the substitute manual as a detailed manual.

The processor 130 may select one of a plurality of contents 1111, 1112, 1113, 1121, 1122, 1123, 1131, 1132, and 1133 based on the sub-content provided to the display device 200 and the determined understanding level.

The processor 130 may select sub-content corresponding to the next step of sub-content provided to the display device 200 among the plurality of sub-contents of the substitute manual when the understanding level is high, and select sub-content corresponding to the step of the sub-content provided to the display device 200 among the plurality of sub-content of the substitute manual when the understanding level is low level. For example, if sub-content 1121 for step 1 is provided to display device 200, and the understanding level of sub-content 1121 is determined to be high, the processor 130 may select content 1112 corresponding to step 2, which is the next step of step 1 among the plurality of sub-content 1111, 1112, and 1113 of the simple manual. Conversely, if it is determined that the understanding level of the sub-content 1121 is low, the processor 130 may select the content 1131 corresponding to the step 1 among the plurality of sub-contents 1131, 1132, and 1133 of the detailed manual.

The processor 130 may provide the selected sub-content to the display device 200.

According to the descriptions of FIGS. 8 and 11, the electronic apparatus 100 may reflect the user's understanding level of the manual provided to the display device 200 and provide a new manual to a user, and the user may receive a new manual to correspond to the user's understanding level for the provided manual.

Figure 12:
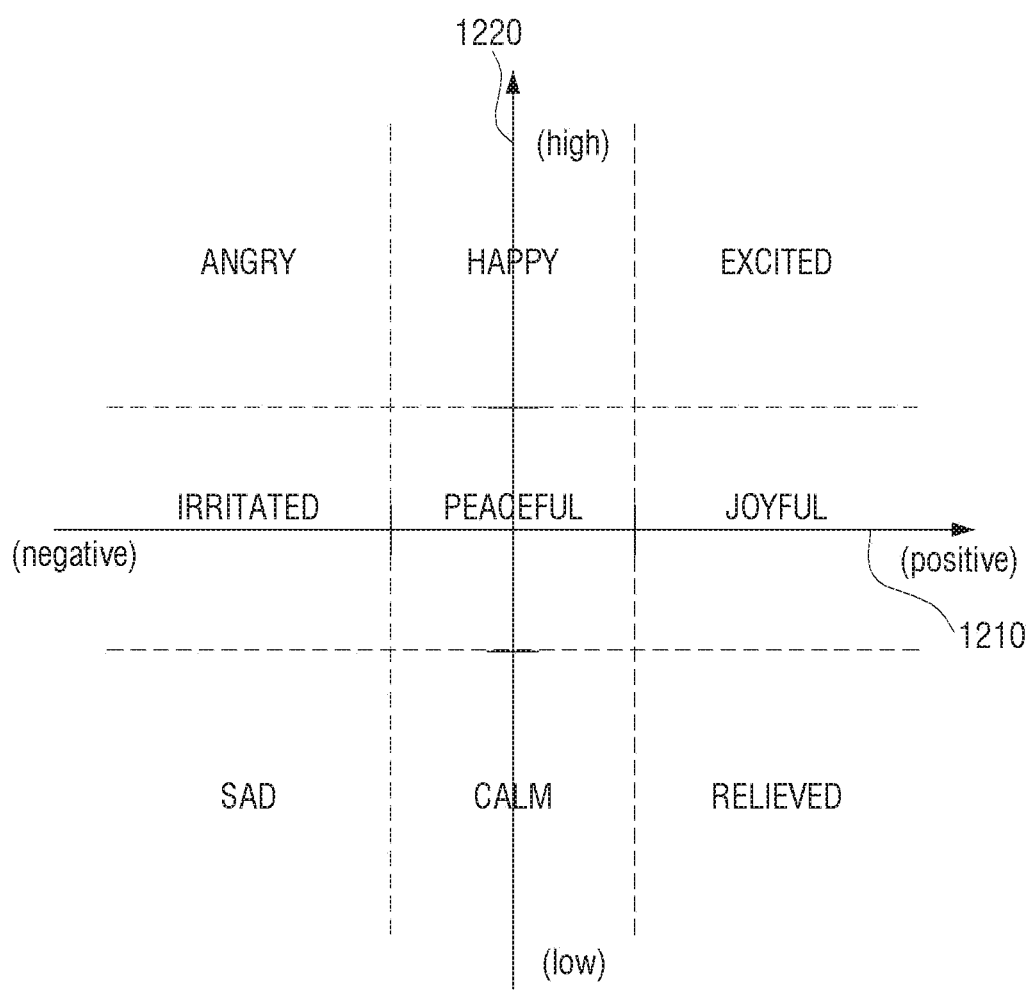
FIG. 12 is a view to describe an electronic apparatus for determining an understanding level from user voice information according to an embodiment of the disclosure.

FIG. 12 is a view to describe an electronic apparatus for determining an understanding level from user voice information according to an embodiment of the disclosure.

Referring to FIG. 12, the processor 130 may receive user voice information as the user response to the provided content. The processor 130 may obtain emotion parameter from the received user voice information.

The emotion parameter is a variable representing user's predefined emotions (e.g., positive, negative, happy, excited, joyful, relieved, peaceful, calm, irritated, angry, sad, fury, bored, or the like), and may be obtained based on the semantic information or height information of the user voice. The type of emotion parameter may be preset by the user or the system.

The emotion parameter may be obtained by inputting voice information to a deep learning neural network model. The processor 130 may obtain the emotion parameter for the user voice by inputting user voice information to the deep learning neural network model such as deep neural network (DNN), convolutional neural network (CNN), recurrent neural network (RNN), or the like.

Referring to FIG. 12, the emotion parameter for the user voice may be defined in a two-dimensional space including a first axis 1210 corresponding to the meaning of the user voice and a second axis 1220 corresponding to the height of the user voice.

The processor 130 may determine the height of the user voice using the user voice information. To be specific, the processor 130 may determine the height of the user voice by analyzing a frequency (or the number of vibrations) of the received user voice information.

The processor 130 may input the user voice information to the deep learning neural network model and determine whether the meaning of the user utterance included in the user voice information is positive, neutral, or negative.

The processor 130 may obtain the emotion parameter for the user voice using the semantic information of the user voice obtained from the user voice information and the height information of the user voice.

For example, when the meaning of the user voice is positive and the height of the user voice is greater than or equal to the first predetermined value, the processor 130 may obtain "excited" as the value of the emotion parameter. If the meaning of the user voice is negative and the height of the user voice is less than the second predetermined value, the processor 130 may obtain "sad" as the value of the emotion parameter.

The processor 130 may determine the understanding level of the manual based on the obtained emotion parameter. For example, when the emotion parameter has a predetermined first value (e.g., positive, joyful, excited, or the like), the processor 130 may determine that the understanding level is a high level. In addition, when the emotion parameter has a preset second value (e.g., negative, angry, sad, or the like), the processor 130 may determine that the understanding level is a low level. In addition, the processor 130 may determine that the understanding level is a neutral level when the emotion parameter has a predetermined third value or the value is not a predetermined first value and a second value.

Although the emotion parameters are described as being obtained by the semantic information and the height information of the user voice information in FIG. 12, it is not limited thereto. The emotion parameter may be obtained by one of the semantic information and the height information of the user voice information. For example, by using only the semantic information of the user voice information, the processor 130 may determine that the understanding level is a high level when the semantic information is "positive," understanding level is a neutral level when the semantic information is "neutral," and understanding level is a low level when the semantic information is "negative."

The processor 130 may determine the understanding level for the manual using the emotion parameter obtained through the user voice information, determine a substitute manual based on the determined understanding level, and determine a reproduction starting point of the determined substitute manual.

Figure 14:
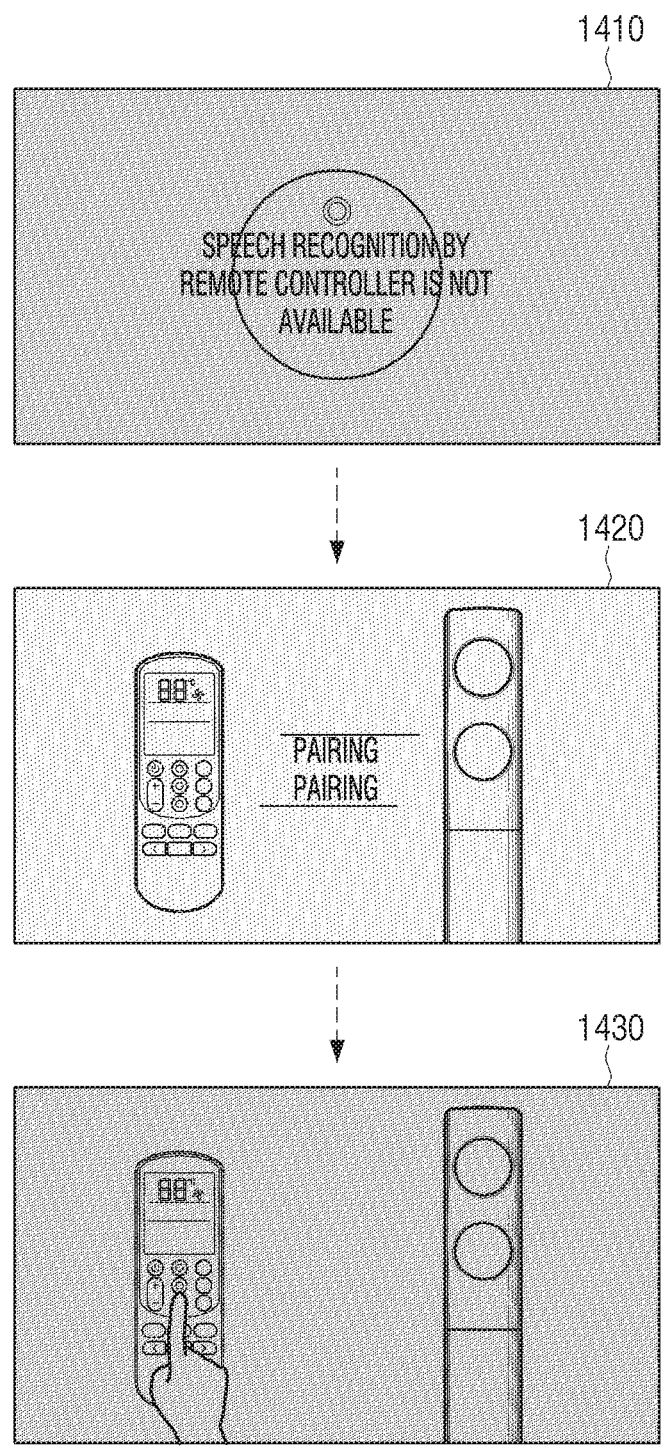

FIGS. 13 and 14 are views to describe an electronic apparatus for determining a reproduction starting point of a substitute manual according to various embodiments of the disclosure.

FIG. 13 is a view to describe an electronic apparatus for determining a reproduction starting point of a substitute manual using state information of an external device according to an embodiment of the disclosure.

Referring to FIG. 13, the substitute manual determined by the processor 130 may include at least one frame corresponding to the plurality of steps. Although FIG. 13 illustrates one frame corresponding to each step for convenience, each step may include at least one frame. For example, a manual related to an air conditioner filter cleaning method may include at least one frame 1310 corresponding to a guiding step, at least one frame 1320 corresponding to a step in which a "filter cleaning" warning is displayed on a display of the air conditioner, at least one frame 1330 corresponding to the filter separation step, at least one frame 1340 corresponding to the filter cleaning step, and at least one frame 1350 corresponding to the filter drying step.

In addition, as described above in FIG. 8, the memory 120 may store information on a plurality of sections corresponding to a plurality of steps included in the manual. For example, in the memory 120, with respect to the manual related to the air conditioner filter cleaning method, the information on each section that each section of the manual includes guiding, displaying the filter cleaning warning, filter separation, filter cleaning, and filter drying and information on the reproduction point of each section, or the like, may be stored.

The processor 130 may receive the state information of the external device from the external device corresponding to the manual and determine the state of the external device.

The processor 130 may determine a section including the state of the external device among the plurality of sections (or steps) included in the substitute manual, based on information on a plurality of sections of the substitute manual stored in the memory 120. For example, the processor 130 may receive the state information that the filter 1301 of the air conditioner 1300 is removed from the air conditioner 1300, and may determine that the section including the state in which the filter of the air conditioner is removed, from among the plurality of steps included in the substitute manual, is the section including the frame 1330, based on the information on the plurality of sections of the substitute manual.

The processor 130 may determine the section next to the section corresponding to the determined state of the external device as the reproduction starting point of the substitute manual. That is, the processor 130 may determine the section including the frame 1340 which is the next section of the section including the frame 1330 as the reproduction starting point of the substitute manual.

The processor 130 may transmit information about the reproduction starting point of the substitute manual and the substitute manual to the display device 200, and the display device 200 may reproduce the substitute manual based on the received reproduction starting point information. According to the embodiment of FIG. 13, a display device may reproduce a manual from a section including a frame 1340, which is a reproduction starting point, while skipping a section including frames 1310, 1320, and 1330 among a plurality of sections of the substitute manual.

FIG. 14 is a view to describe an electronic apparatus for determining a reproduction starting point of a manual based on a reproduction history of a manual according to an embodiment of the disclosure.

Referring to FIG. 14, similar to FIG. 13, the substitute manual determined by the processor 130 may include a plurality of steps, and include at least one frame corresponding to each of the plurality of steps.

The memory 120 may store information on a plurality of sections corresponding to a plurality of steps included in the manual. The information on a plurality of sections may include information related to the number of reproductions of the plurality of sections.

The steps included in the manual may be the same, even if the manuals are different. For example, "a manual related to a voice recognition setting method of an air conditioner" and "a manual related to a method for setting a voice recognition of a TV" are different manuals, but both manuals may include "a pairing step using a remote controller." In this case, information on the number of reproduction times per section of the manual stored in the memory 120 may include the number of times reproduced through another manual. The number of reproductions of the section included in the manual may be calculated independently of the number of reproductions of the manual and stored. For example, even if it is stored that the manual related to the voice recognition setting method of the air conditioner has been reproduced once, the section corresponding to the "pairing step using the remote controller" included in the manual related to the method for setting the voice recognition of the air conditioner may be stored as being reproduced for three times.

The processor 130 may determine the substitute manual based on the number of times of reproduction for each section of the manual stored in the memory 120. When the number of times of reproduction of each section of the manual is greater than or equal to a preset value, the processor 130 may replace a manual for a section of which the number of times of reproduction is greater than or equal to a preset value as a simple manual and provide the same to the display device 200.

For example, it may be assumed that the manual related to the voice recognition setting method for an air conditioner is divided into a start guide section 1410, a section for setting pairing with a remote controller 1420, a section for pressing a voice recognition button in a remote controller 1430, and the section 1420 has been reproduced for the predetermined number of times or more.

In the display device 200, in a state where a section corresponding to the section 1410 is reproduced and a substitute manual according to an understanding level is selected, the processor 130 can determine a section 1420 which has been reproduced for greater than or equal to a predetermined number of times, among the plurality of sections 1410, 1420, and 1430 of the manual. In addition, the processor 130 may set the next section of the determined section as the starting section of the substitute manual, and determine the starting point of the set start section as the reproduction starting point of the substitute manual.

Referring to FIGS. 8 to 14, it has been described that the electronic apparatus 100 provides a manual to the display device 200 based on user response information received from the user terminal device 300, but it is not necessarily limited thereto. Specifically, according to another embodiment, the electronic apparatus 100 may receive a manual request command from the display device 200 and transmit a manual to the display device 200 in accordance with the received manual request command.

Figure 15:
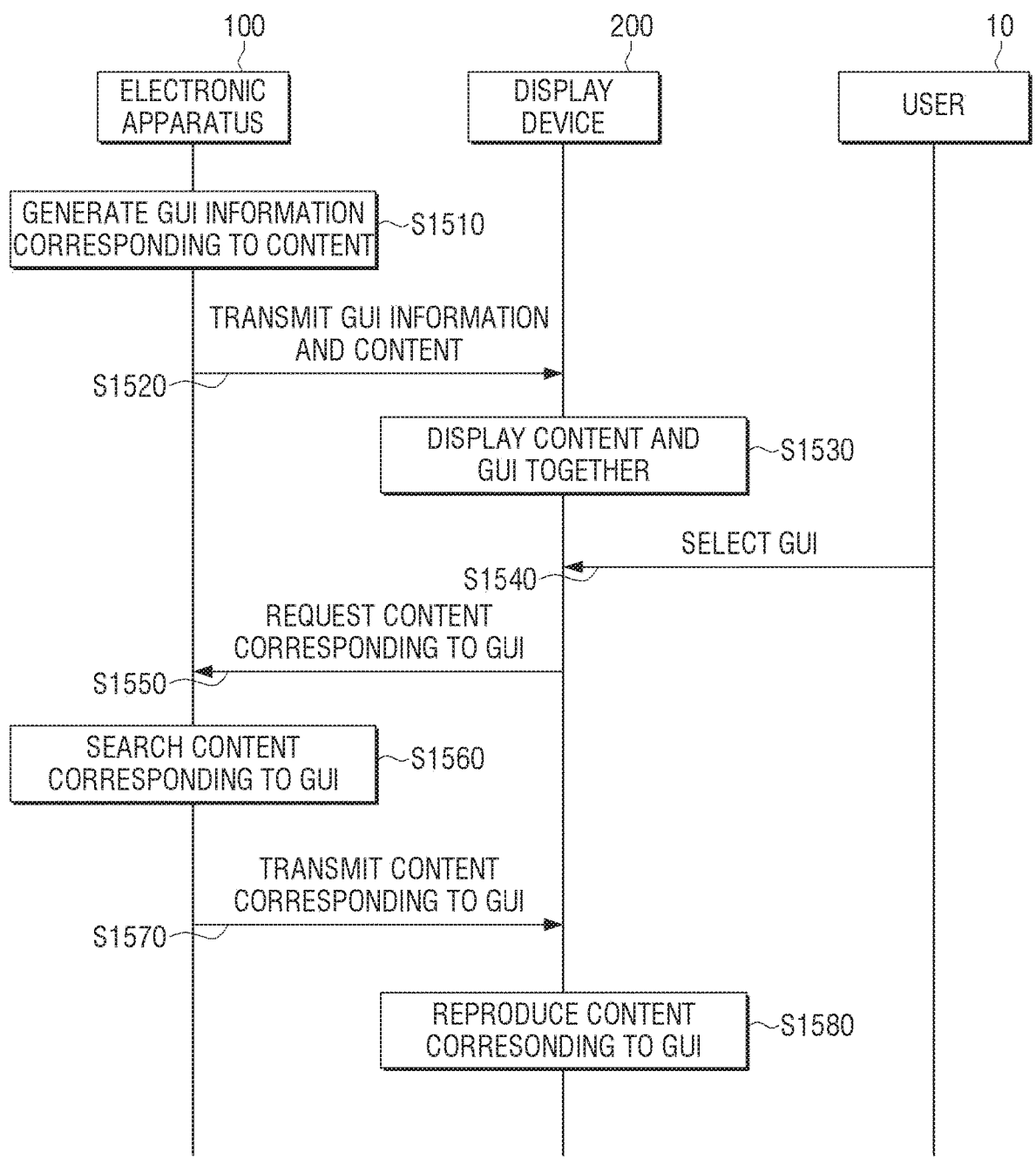
Figure 16:
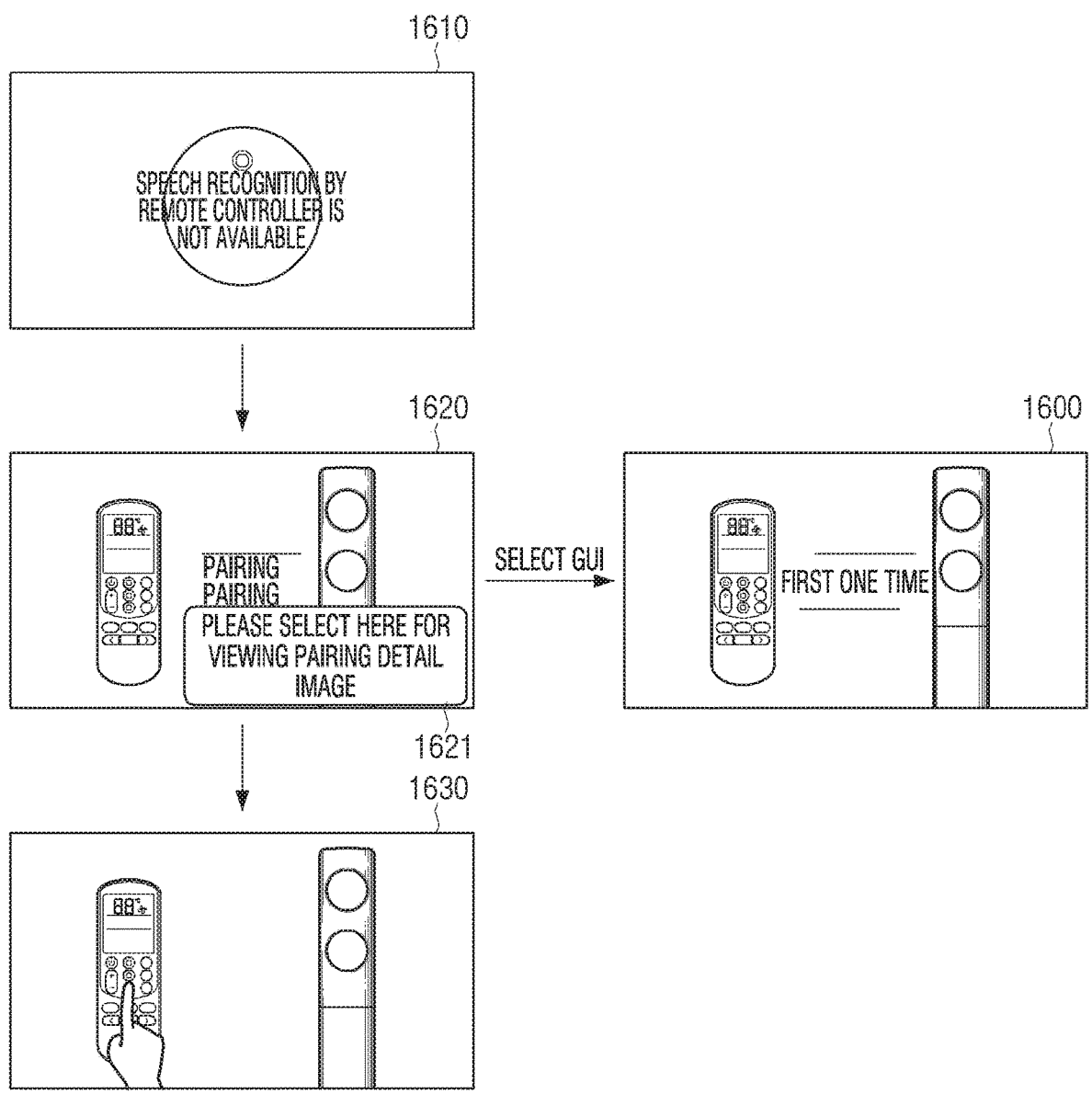

FIGS. 15, 16, and 17 are views to describe an electronic apparatus for receiving a manual transmission command from the display device 200 according to various embodiments of the disclosure. FIG. 15 is a sequence view to describe a manual transmission process between the electronic apparatus 100 and the display device 200 according to an embodiment of the disclosure.

Referring to FIG. 15, the processor 130 may generate graphic user interface (GUI) information of a manual provided to the display device 200 in operation S1510. The processor 130 may generate GUI information corresponding to the manual by using information on each section of the manual stored in the memory 120. The GUI information may include image information included in the GUI, text information, location information on which the GUI is displayed, time information of a manual displayed with the GUI, manual information corresponding to the GUI, or the like.

The processor 130 may transmit the generated GUI information and content to the display device 200 in operation S1520, and the display device 200 may display the GUI corresponding to the GUI information with the content using the received GUI information in operation S1530. The display device 200 may generate a GUI corresponding to GUI information using image information and text information among the received GUI information, and may display the GUI together with the manual in consideration of the information on the location where the GUI is displayed and the time information of the manual, or the like.

The display device 200 may receive an input for selecting a GUI from the user 10 in operation S1540. The user 10 may select the GUI through touch input to the display, or may select the GUI through a separate input interface, such as a button. The user 10 may also select a GUI through an input interface of a remote controller (not shown) for the display device 200.

The display device 200, when receiving a user input for selecting a GUI, may request a manual corresponding to the GUI selected by the user input in operation S1550. The display device 200 may transmit information on a manual corresponding to the GUI included in the GUI information to the electronic apparatus 100.

The processor 130 may search a manual corresponding to the GUI in response to a request command received from the display device 200 in operation S1560, and transmit the manual to the display device 200 in operation S1570. Based on the manual information corresponding to the GUI received from the display device 200, the processor 130 may search a manual corresponding to the GUI and transmit the searched manual to the display device 200.

The display device 200 may reproduce the received manual in operation S1580.

The GUI may correspond to a variety of manuals. The GUI may correspond to a specific section of a general manual, a detailed manual, and a simple manual, but may correspond to a magnified manual in which a specific area of the manual is magnified or a reduction manual in which a specific area of the manual is reduced.

FIGS. 16 and 17 are views to describe an electronic apparatus for transmitting a manual corresponding to the GUI displayed on the display device according to various embodiments of the disclosure.

Referring to FIG. 16, if it is determined that a manual associated with a speech recognition method of an air conditioner is divided into a first section including a frame 1610, a second section including a frame 1620, and a third section including a frame 1630, and that there is a pairing detail image of pairing with respect to the second section, the processor 130 may generate GUI information requesting a pairing detail image related to the second section and transmit the GUI information to the display device 200.

If the display device 200 receives a user input selecting a GUI 1621 displayed on the display device 200 based on the GUI information, the processor 130 may receive a manual request command corresponding to the GUI from the display device 200 and provide the pairing detail image associated with the second section to the display device 200.

In this case, the display device 200 may reproduce a manual 1600 corresponding to the selected GUI instead of the second section including a frame 1620.

Referring to FIG. 17, the processor 130 may generate GUI information corresponding to an enlarged image corresponding to a specific section of the manual, such as frame 1710 labeling the buttons and other features of an air condition, and transmit the GUI information to the display device 200. Referring to FIG. 17, while the GUI corresponding to the enlarged image is displayed, the GUI is not necessarily limited thereto, and the GUI may be a GUI corresponding to the reduced image reproduction, a GUI corresponding to the image reproduction of another view, or the like.

When determining that there is a magnified image with respect to a frame 1710 included in the manual, the processor 130 may generate GUI information for requesting a magnified image of the frame 1710 and transmit the information to the display device 200.

When the display device 200 receives a user input selecting a GUI 1711 corresponding to a request for an enlarged image, the display device 200 may transmit an enlarged image request command corresponding to the selected GUI to the electronic apparatus 100, and the processor 130 may transmit the manual according to the received request command to the display device 200.

This is merely exemplary, and if the display device 200 selects a GUI corresponding to the enlarged image, the display device 200 may enlarge and display the manual displayed on the display device 200 as shown in frame 1720. The display device 200 may not receive the manual corresponding to the GUI from the electronic apparatus 100, but may magnify the provided manual and provide the same.

Figure 18:
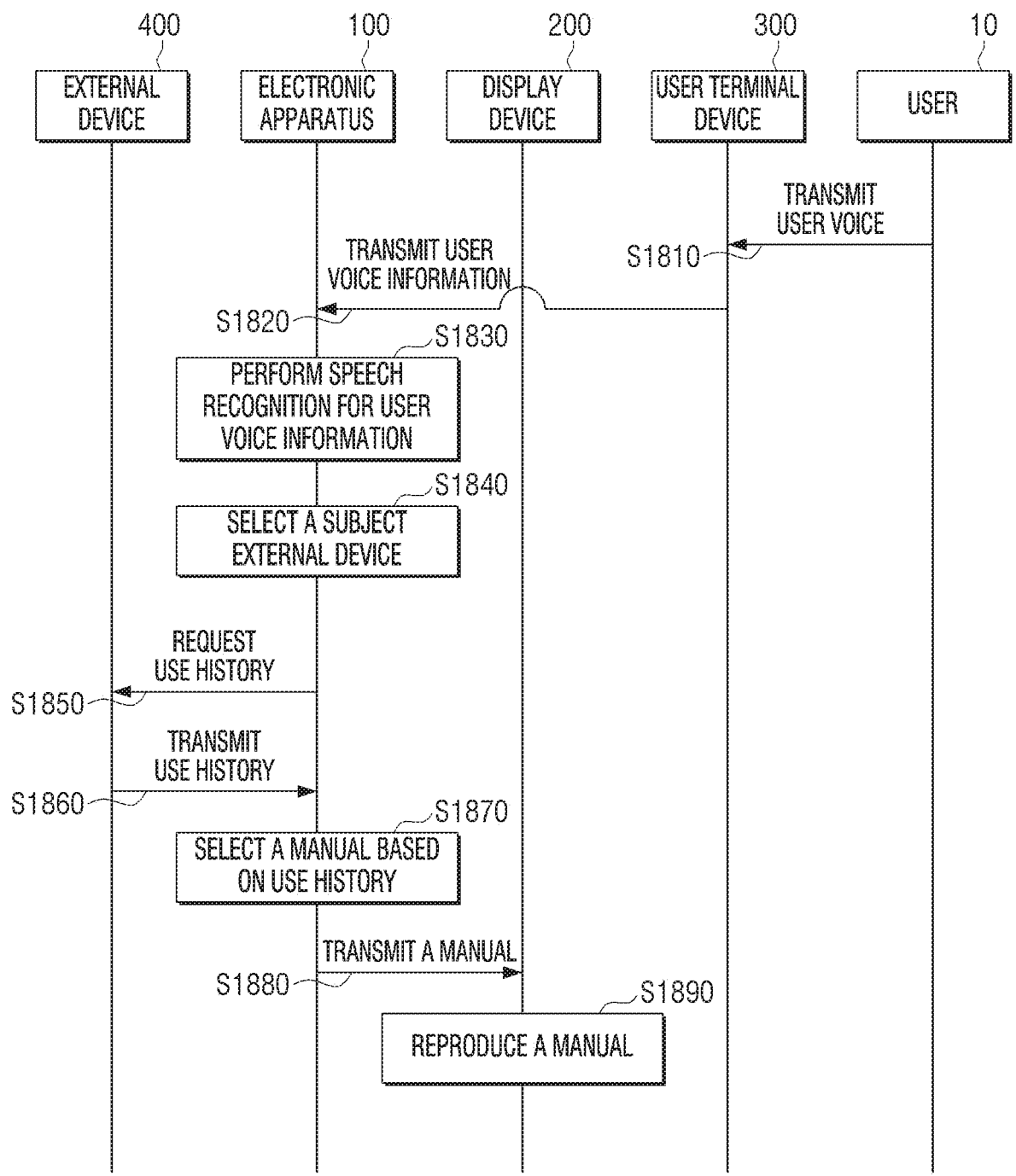
FIG. 18 is a sequence view including an electronic apparatus according to an embodiment of the disclosure.

FIG. 18 is a sequence view including an electronic apparatus according to an embodiment of the disclosure. Specifically, FIG. 18 is a sequence view to describe an electronic apparatus for transmitting a manual for the display device 200.

Referring to FIG. 18, the user terminal device 300 may receive user voice information from the user 10 in operation S1810. The user voice information may include user voice information related to an external device 500.

The user terminal device 300 may transmit the received user voice information to the electronic apparatus 100 in operation S1820. In this case, the processor 130 may perform speech recognition on the user voice using a dialog system pre-stored in the memory 120 in operation 51830. The processor 130 may obtain external device information related to user voice information as a result of voice recognition on the voice of the user, and may determine an external device based on information related to the obtained external device in operation S1840.

The processor 130 may request use history information of the external device 500 to the determined external device 500 in operation S1850, and receive the use history information of the external device 500 from the external device 500 in operation S1860.

The processor 130 may select one of a plurality of manuals related to the external device 500 based on the received use history information in operation S1870. The selected manual may be related to the user voice information.

For example, if the user says "the suction force of the robot cleaner is weak", the processor 130 may determine that the user utterance is associated with the robot cleaner and receive the usage history information of the robot cleaner from the robot cleaner. The processor 130 may select a manual associated with a filter substitution method of the robot cleaner based on the received usage history information of the robot cleaner.

The processor 130 may transmit the selected manual to the display device 200 in operation S1880, and the display device 200 may reproduce the received manual in operation S1890.

Figure 19:
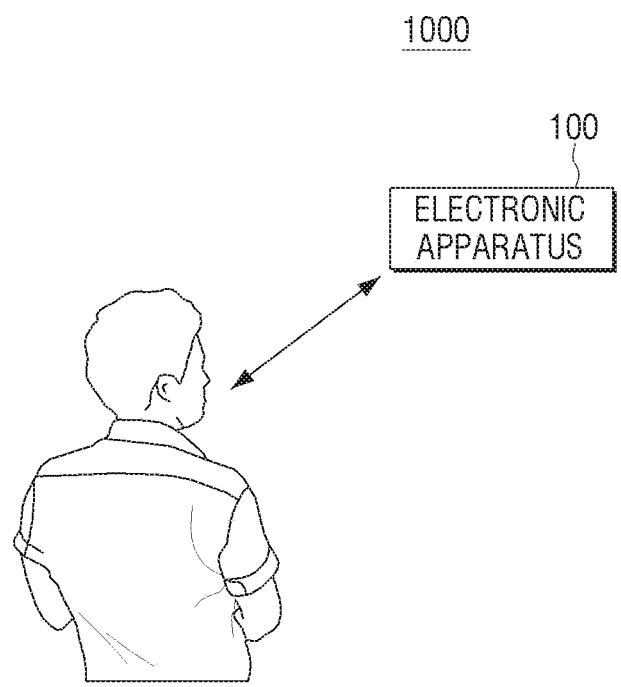
FIG. 19 is a view to describe an electronic apparatus according to an embodiment of the disclosure.

FIG. 19 is a view to describe an electronic apparatus according to an embodiment of the disclosure.

Referring to FIG. 19, the electronic apparatus 100 may directly provide a manual to a user. The electronic apparatus 100 may directly receive a user voice that is uttered while the manual is being reproduced.

Upon receiving a user voice, the electronic apparatus 100 may pre-process a user voice and convert the voice to a user voice signal.

The electronic apparatus 100 may include a dialog system 400 to perform speech recognition on a voice signal, convert the user voice to a text using an automatic speech recognition module included in the dialogue system, analyze the meaning of the user voice using a natural language understanding module, and obtain a user's understanding level for the manual provided based on the height information and semantic information of the user voice.

The electronic apparatus 100 may select a substitute manual in consideration of the type of manual being reproduced and the user understanding level, search the selected substitute manual in the memory 120, or request the substitute manual to an external device (not shown) such as a content server.

The electronic apparatus 100 may determine the reproduction point of the substitute manual and reproduce the section corresponding to the determined reproduction point of the substitute manual, in consideration of the user voice information, reproduction history information of the substitute manual, state information of an external device, or the like.

The electronic apparatus 100 may be implemented with various types of electronic apparatuses. For example, the electronic apparatus 100 may be implemented as, for example, smartphones, tablet PCs, mobile phones, video telephones, electronic book readers, desktop PCs, laptop PCs, netbook computers, workstations, servers, a personal digital assistant (PDA), a portable multimedia player (PMP), an MP3 player, a medical device, a camera, or a wearable device.

Figure 20:
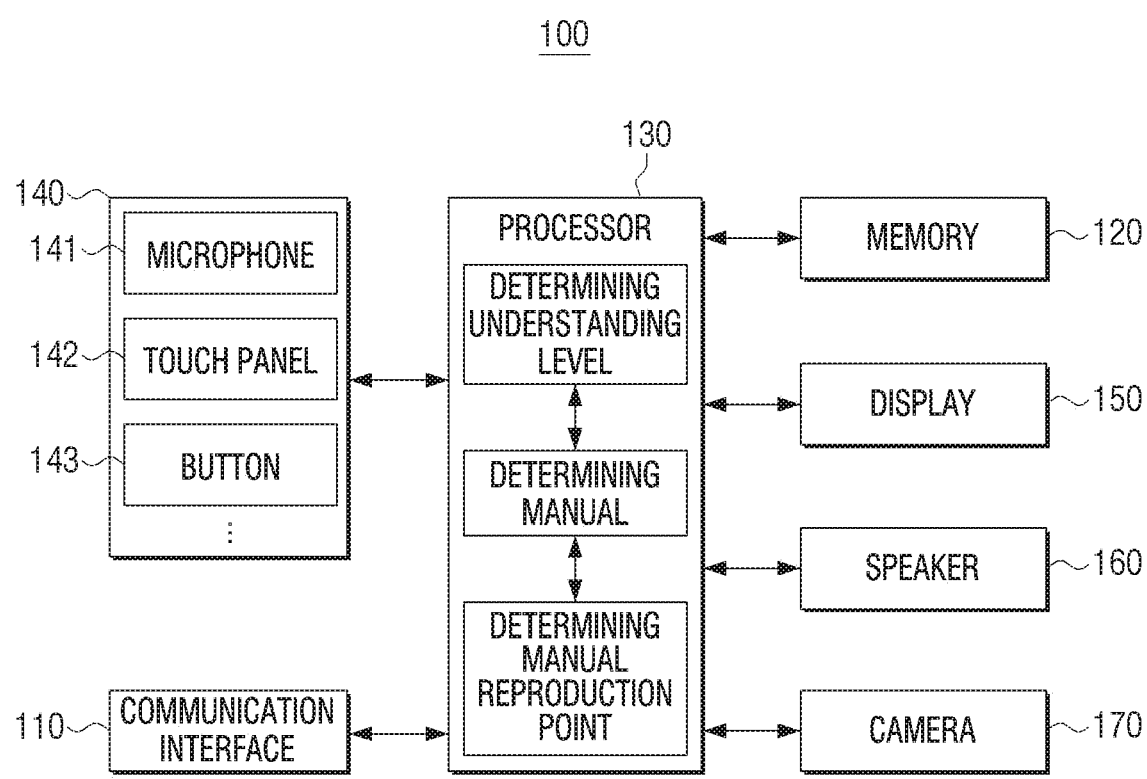
FIG. 20 is a block diagram illustrating an electronic apparatus according to an embodiment of the disclosure.

FIG. 20 is a block diagram illustrating an electronic apparatus according to an embodiment of the disclosure.

Referring to FIG. 20, the electronic apparatus 100 may include the communication interface 110, the memory 120, the input interface 140, the display 150, a speaker 160, a camera 170, and the processor 140. The descriptions of the communication interface 110, the memory 120, and the processor 130 shared with FIG. 2 will not be further described.

The input interface 140 may receive user input to control the electronic apparatus 100. The input interface 140 may receive user voice information for the reproduced content, or receive a user input for selecting a GUI displayed in the display. As illustrated in FIG. 20, the input interface 140 may include a microphone 141 for receiving an input of a user voice, a touch panel 142 for receiving a user touch using user hand or a stylus pen, and a button 143 for receiving a user manipulation, or the like. However, an example of the input interface 140 as illustrated in FIG. 20 is merely an example, and another input interface (e.g., keyboard, mouse, motion inputter, or the like) may be implemented.

The display 150 is a configuration to display an image and may be implemented as, for example, a liquid crystal display (LCD), and cathode-ray tube (CRT), plasma display panel (PDP), organic light emitting diodes (OLED), transparent OLED (TOLED) for some cases.

The display 150 may display various information according to a control of the processor 130. The display 150 may display one of a plurality of manuals related to an external device. In addition, the display 150 may generate a GUI related to a manual. The display 150 may be implemented as a touch screen along with the touch panel 142.

The speaker 160 is a configuration to output not only various audio data processed as decoding, amplification, and noise filtering but also various notification sounds or voice message. The speaker 160 may output a response to the user inquiry as a voice message in a natural language format. The configuration to output audio may be implemented as a speaker, but this is an example and may be implemented as an output terminal for outputting audio data.

The camera 170 is configured to photograph an image. The camera 170 can be installed at the top, bottom, or left and right sides of the display 150 so that a user viewing the screen displayed on the display 150 can be photographed. In addition, the camera 170 may be additionally installed on at least one of the front surface, the rear surface, the left side surface, or the right side surface, so as to photograph a user's attitude, operation, or the like.

The computer instructions for performing the processing operations of the electronic apparatus 100 according to the various embodiments described above may be stored in a non-transitory computer-readable medium. The computer instructions stored in this non-transitory computer-readable medium may cause the above-described specific device to perform the processing operations in the electronic apparatus 100 according to the above-described various example embodiments when executed by the processor of the device.

The non-transitory computer readable medium refers to a medium that stores data semi-permanently rather than storing data for a very short time, such as a register, a cache, a memory or etc., and is readable by an apparatus. The aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A manual providing method of an electronic apparatus, the method comprising:
    providing a display device with one of a plurality of manuals for an external device, wherein the plurality of manuals incudes a general manual, a detailed manual, and a simple manual;
    obtaining a user response comprising user voice information and user image information for the provided manual, wherein the user voice information includes voice information uttered while listening to or viewing the provided manual;
    determining an understanding level for the provided manual based on the obtained user response, wherein the understanding level is:
        a high level based on a voice height of the user voice information being greater than or equal to a predetermined first value,
        a low level based on the voice height of the user voice information being less than a predetermined second value, and
        a neutral level based on the voice height of the user voice information being greater than or equal to the predetermined second value;
    substituting the provided manual with another manual among the plurality of manuals according to the understanding level,
    wherein the substituting the provided manual with another manual comprises:

substituting the manual with the detailed manual when the understanding level is the low level and the manual corresponds to the general manual, and substituting the manual with the general manual or the detailed manual when the understanding level is the low level and the manual corresponds to the simple manual, receiving state information of the external device from the external device; and determining a reproduction starting point in the substituted manual based on a recognition result of the user voice information included in the user response or the state information, wherein the determining the reproduction starting point comprises:

in responding to the understanding level being the low level, setting the reproduction starting point to a section in the substituted manual corresponding to a last reproduced section of the provided manual, and in responding to the understanding level being the neutral level or the high level, setting the reproduction starting point to a section in the substituted manual corresponding to the section that follows the most recently reproduced section of the provided manual.

2. The method of claim 1, wherein the general manual, the detailed manual, and the simple manual are divided into a plurality of sub-contents that are sequentially reproduced.

3. The method of claim 1, wherein the determining of the understanding level comprises:

determining an understanding level for the manual based on the received state information of the external device.

4. The method of claim 1, wherein the determining of the understanding level further comprises:

obtaining an emotion parameter from voice information included in the user response, and determining the understanding level further based on the emotion parameter.

5. The method of claim 1, wherein the substituting of the provided manual further comprises:

streaming data from the determined reproduction starting point, among an entire reproduction section of the substituted manual, to the display device.

6. The method of claim 1, wherein the substituting of the provided manual comprises substituting the provided manual by providing the display device with address information corresponding to the substituted manual and information on the reproduction starting point.

7. An electronic apparatus comprising:
a communication interface;
a memory; and
a processor configured to:

control the communication interface to provide a display device with one of a plurality of manuals for an external device, wherein the plurality of manuals includes a general manual, a detailed manual, and a simple manual, obtain a user response comprising user voice information and user image information for the provided manual, wherein the user voice information includes voice information uttered while listening to or viewing the provided manual, determine an understanding level for the provided manual based on the user response, wherein the understanding level is:

a high level based on a voice height of the user voice information being greater than or equal to a predetermined first value, a low level based on the voice height of the user voice information being less than a predetermined second value, and a neutral level based on the voice height of the user voice information being greater than or equal to the predetermined second value, substitute the manual with another manual among the plurality of manuals according to the understanding level, substitute the manual with the detailed manual when the understanding level is the low level and the manual corresponds to the general manual, substitute the manual with the general manual or the detailed manual when the understanding level is the low level and the manual corresponds to the simple manual, receive state information of the external device from the external device, determine a reproduction starting point in the substituted manual based on a recognition result of the user voice information included in the user response or the state information, in responding to the understanding level being the low level, set the reproduction starting point to a section in the substituted manual corresponding to a last reproduced section of the provided manual, and in responding to the understanding level being the neutral level or the high level, set the reproduction starting point to a section in the substituted manual corresponding to the section that follows the most recently reproduced section of the provided manual.

8. The electronic apparatus of claim 7, wherein the general manual, the detailed manual, and the simple manual are divided into a plurality of sub-contents that are sequentially reproduced.

9. The electronic apparatus of claim 7, wherein the processor is further configured to:

determine an understanding level for the manual based on the received state information of the external device.

10. The electronic apparatus of claim 7, wherein the processor is further configured to:

obtain an emotion parameter from voice information included in the user response, and determine the understanding level based on the emotion parameter.

11. The electronic apparatus of claim 7, wherein the processor is further configured to stream data from the determined reproduction starting point, among an entire reproduction section of the substituted manual, to the display device.

12. The electronic apparatus of claim 7, wherein the processor is further configured to substitute the provided manual by providing the display device with address information corresponding to the substituted manual and information on the reproduction starting point.

* * * * *